US012589311B2

(12) United States Patent
Horn et al.

(10) Patent No.: US 12,589,311 B2
(45) Date of Patent: Mar. 31, 2026

(54) PERFORMANCE PREDICTION FOR VIRTUALIZED GAMING APPLICATIONS

(71) Applicant: Google LLC, Mountain View, CA (US)

(72) Inventors: Douglas Horn, San Francisco, CA (US); Pujun Lun, Mountain View, CA (US); Joseph McCarthy, Mountain View, CA (US)

(73) Assignee: Google LLC, Mountain View, CA (US)

( * ) Notice: Subject to any disclaimer, the term of this patent is extended or adjusted under 35 U.S.C. 154(b) by 290 days.

(21) Appl. No.: 18/352,683

(22) Filed: Jul. 14, 2023

(65) Prior Publication Data

US 2025/0018299 A1     Jan. 16, 2025

(51) Int. Cl.
*A63F 13/67*     (2014.01)
*A63F 13/52*     (2014.01)

(52) U.S. Cl.
CPC .............. *A63F 13/67* (2014.09); *A63F 13/52* (2014.09)

(58) Field of Classification Search
CPC .......... A63F 13/67; A63F 13/52; A63F 13/35; A63F 13/355; A63F 13/77; A63F 13/537; A63F 2300/66; G06F 11/3409; G06F 9/455; G06N 20/00
See application file for complete search history.

(56) References Cited

U.S. PATENT DOCUMENTS

| | | | |
|---|---|---|---|
| 2020/0147500 A1 | 5/2020 | Mahlmeister et al. | |
| 2020/0306632 A1 | 10/2020 | Kolen et al. | |

| | | | | |
|---|---|---|---|---|
| 2021/0220733 A1 | 7/2021 | Zimring et al. | | |
| 2021/0299574 A1 | 9/2021 | Pare et al. | | |
| 2022/0280867 A1 | 9/2022 | Norton | | |
| 2023/0142004 A1* | 5/2023 | Verma ..................... A63F 13/77 | | |
| | | | | 463/42 |

FOREIGN PATENT DOCUMENTS

| | | |
|---|---|---|
| WO | 2016181549 A1 | 11/2016 |
| WO | 2021056478 A1 | 4/2021 |
| WO | 2021230916 A1 | 11/2021 |

OTHER PUBLICATIONS

Extended Search Report from counterpart European Application No. 24185502.2 dated Nov. 25, 2024, 13 pp.

(Continued)

*Primary Examiner* — Peter J Iannuzzi
(74) *Attorney, Agent, or Firm* — Shumaker & Sieffert, P.A.

(57)     ABSTRACT

A computing system may receive, from a computing device, an indication of one or more device characteristics of the computing device. The computing system may determine, using a gaming performance model trained using machine learning to determine predicted performance scores of the gaming application and based at least in part on the one or more device characteristics of the computing device and one or more application characteristics of a gaming application, a predicted performance of the gaming application when executing in a virtualized environment at the computing device. The computing system may send, to the computing device, an indication of the predicted performance of the gaming application when executing in the virtualized environment at the computing device.

20 Claims, 8 Drawing Sheets

(56)                    References Cited

OTHER PUBLICATIONS

Vishnumolakala, "Performance evaluation of Gaming Anywhere server in a virtual environment", Master of Science in Telecommunication Systems, Jun. 2018, 26 pp.

Notification of Reason for Refusal, and translation thereof, from counterpart Japanese Application No. 2024-112454 dated Jul. 25, 2025, 8 pp.

Response to Extended Search Report dated Nov. 25, 2024, from counterpart European Application No. 24185502.2 filed Jul. 2, 2025, 21 pp.

Office Action, and translation herewith, from counterpart Korean Application No. 10-2024-0091090 dated Sep. 12, 2025, 14 pp.

Response to Notification of Reason for Refusal, and translation thereof, dated Jul. 25, 2025, from counterpart Japanese Application No. 2024-112454 filed Nov. 5, 2025, 14 pp.

Response to Office Action, and translation thereof, dated Sep. 12, 2025 from Korean Patent Application No. 10-2024-0091090 filed Nov. 18, 2025, 46 pp.

Notification of Reason for Refusal, and translation thereof, from counterpart Japanese Application No. 2024-112454 dated Jan. 19, 2026, 4 pp.

* cited by examiner

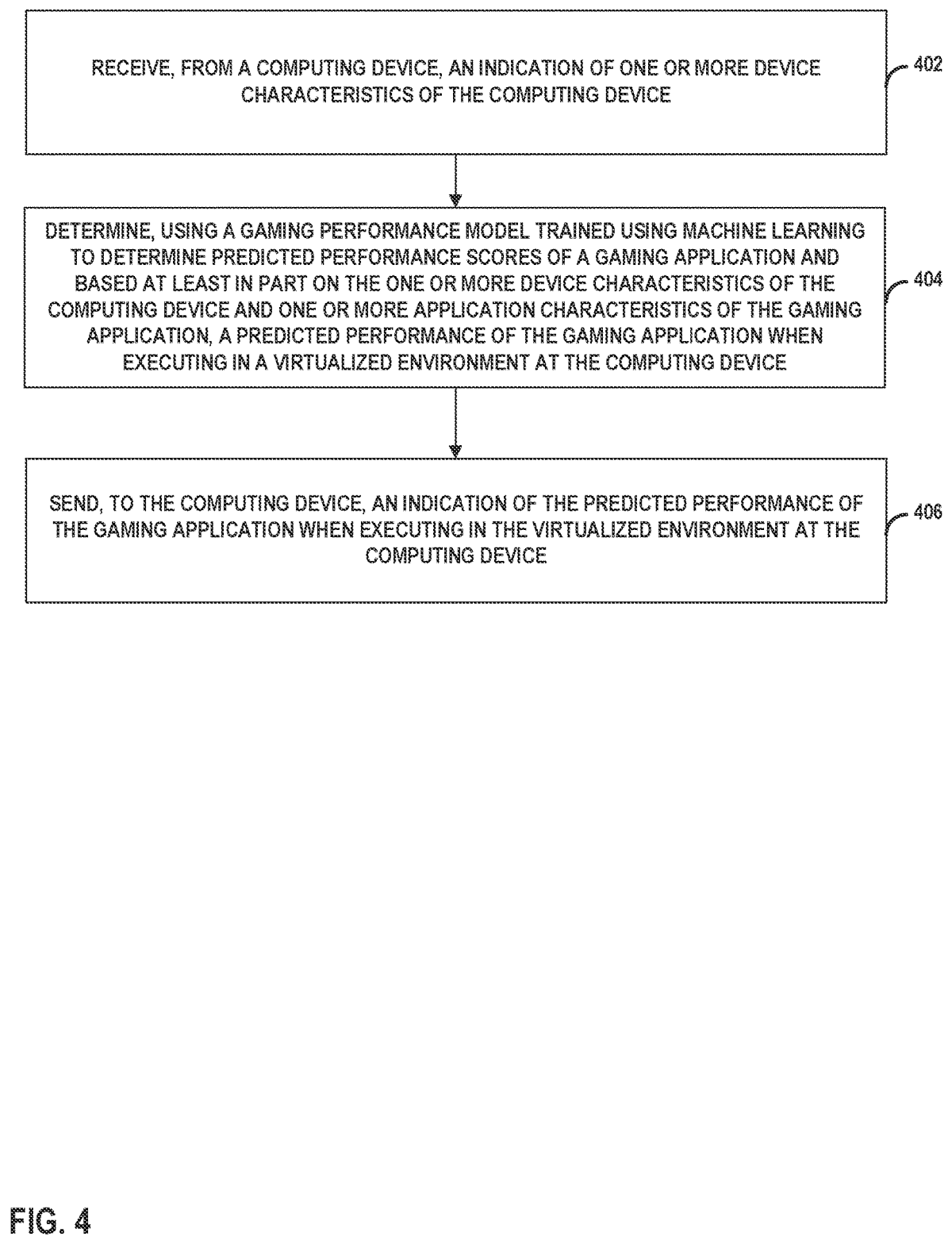

RECEIVE, FROM A COMPUTING DEVICE, AN INDICATION OF ONE OR MORE DEVICE CHARACTERISTICS OF THE COMPUTING DEVICE ⌐ 402

DETERMINE, USING A GAMING PERFORMANCE MODEL TRAINED USING MACHINE LEARNING TO DETERMINE PREDICTED PERFORMANCE SCORES OF A GAMING APPLICATION AND BASED AT LEAST IN PART ON THE ONE OR MORE DEVICE CHARACTERISTICS OF THE COMPUTING DEVICE AND ONE OR MORE APPLICATION CHARACTERISTICS OF THE GAMING APPLICATION, A PREDICTED PERFORMANCE OF THE GAMING APPLICATION WHEN EXECUTING IN A VIRTUALIZED ENVIRONMENT AT THE COMPUTING DEVICE ⌐ 404

SEND, TO THE COMPUTING DEVICE, AN INDICATION OF THE PREDICTED PERFORMANCE OF THE GAMING APPLICATION WHEN EXECUTING IN THE VIRTUALIZED ENVIRONMENT AT THE COMPUTING DEVICE ⌐ 406

FIG. 4

PERFORMANCE PREDICTION FOR VIRTUALIZED GAMING APPLICATIONS

BACKGROUND

Computing devices may vary in many ways, such as central processing unit (CPU) performance, graphics processing unit (GPU) performance, display sizes and/or resolutions, memory performance, and the like. Due to such differences in device configurations, a gaming application that executes on a variety of computing devices may perform differently across the different computing devices. For example, a gaming application may output image data at different frame rates while executing on different computing devices.

SUMMARY

In general, techniques of this disclosure are directed to determining the predicted performance of a gaming application when executing on a computing device. The predicted performance indicates how well the gaming application is anticipated to perform when executing at the computing device. A computing system may determine a predicted performance of a gaming application when executing in a virtualized environment at a computing device based at least in part on one or more device characteristics of the computing device and one or more application characteristics of the gaming application using a gaming performance model that is trained using machine learning to determine predicted performance scores of the gaming application and may send, to the computing device, an indication of the predicted performance of the gaming application when executing in the virtualized environment at the computing device.

The computing device may determine, based on the predicted performance of the gaming application when executing in the virtualized environment at the computing device, whether to feature and/or recommend the gaming application for download and installation at the computing device. For example, if the predicted performance of the gaming application when executing in the virtualized environment at the computing device indicates that the gaming application may not perform well when executing in the virtualized environment at the computing device, the computing device may refrain from featuring or recommending the gaming application for download and installation at the computing device.

The computing device may also, based on the predicted performance of the gaming application when executing in the virtualized environment at the computing device, adjust one or more graphical parameters of the gaming application. For example, if the predicted performance of the gaming application when executing in the virtualized environment at the computing device indicates that the gaming application may not perform well when executing in the virtualized environment at the computing device, the computing device may decrease the graphics quality of image data rendered and outputted by the gaming application in order to increase the performance of the gaming application when executing in the virtualized environment at the computing device.

In some aspects, the techniques described herein relate to a method including: receiving, by one or more processors of a computing system and from a computing device, an indication of one or more device characteristics of the computing device; determining, by the one or more processors using a gaming performance model trained using machine learning to determine predicted performance scores of the gaming application and based at least in part on the one or more device characteristics of the computing device and one or more application characteristics of a gaming application, a predicted performance of the gaming application when executing in a virtualized environment at the computing device; and sending, by the one or more processors and to the computing device, an indication of the predicted performance of the gaming application when executing in the virtualized environment at the computing device.

In some aspects, the techniques described herein relate to a computing system including: memory; a network interface; and one or more processors operably coupled to the memory and the network interface and configured to: receive, from a computing device and via the network interface, an indication of one or more device characteristics of the computing device; determine, using a gaming performance model trained using machine learning to determine predicted performance scores of the gaming application and based at least in part on the one or more device characteristics of the computing device and one or more application characteristics of a gaming application, a predicted performance of the gaming application when executing in a virtualized environment at the computing device; and send, via the network interface and to the computing device, an indication of the predicted performance of the gaming application when executing in the virtualized environment at the computing device.

In some aspects, the techniques described herein relate to a computer-readable storage medium storing instructions that, when executed, cause one or more processors of a computing system to: receive, from a computing device, an indication of one or more device characteristics of the computing device; determine, using a gaming performance model trained using machine learning to determine predicted performance scores of the gaming application and based at least in part on the one or more device characteristics of the computing device and one or more application characteristics of a gaming application, a predicted performance of the gaming application when executing in a virtualized environment at the computing device; and send, to the computing device, an indication of the predicted performance of the gaming application when executing in the virtualized environment at the computing device.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 4 is a flowchart illustrating an example mode of operation for a computing system to determine the predicted performance of a gaming application when executing at a computing device, in accordance with one or more techniques of the present disclosure.

DETAILED DESCRIPTION

Figure 1:
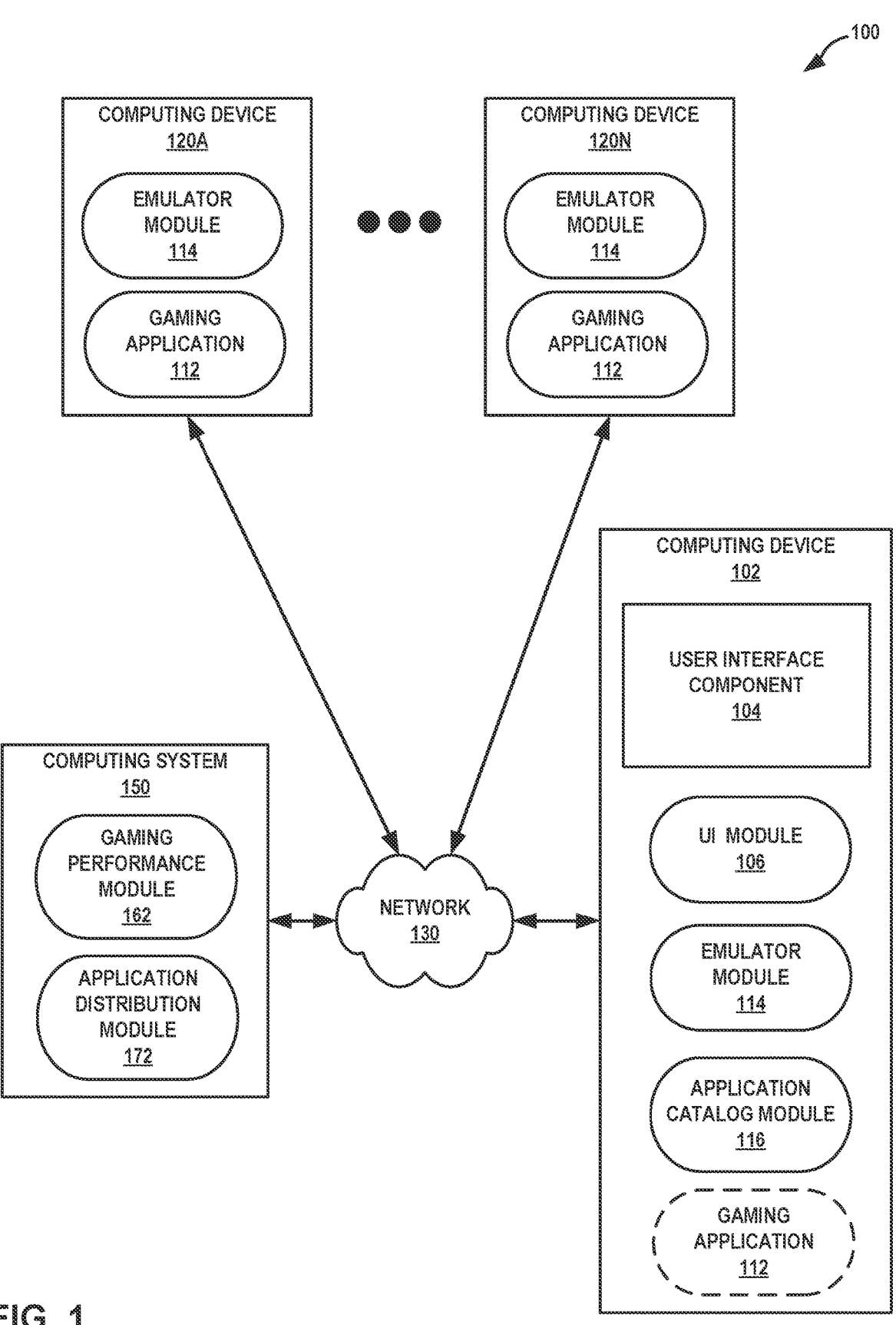
FIG. 1 is a conceptual diagram illustrating an example environment in which an example computing system is configured to determine the predicted performance of a gaming application when executing at an example computing device, in accordance with one or more aspects of the present disclosure.

FIG. 1 is a conceptual diagram illustrating an example environment in which an example computing system is configured to determine the predicted performance of a gaming application when executing at an example computing device, in accordance with one or more aspects of the present disclosure. In the example of FIG. 1, environment 100 may include computing device 102, computing devices 120A-120N (hereafter "computing devices 120"), and computing system 150 that communicate via network 130 to determine the predicted performance of gaming application 112 when executing in a virtualized environment at computing device 102.

Computing system 150 may be any suitable remote computing system, such as one or more desktop computers, laptop computers, mainframes, servers, cloud computing systems, virtual machines, etc. capable of sending and receiving information via network 130. In some examples, computing system 150 may represent a cloud computing system that provides one or more services via network 130. That is, in some examples, computing system 150 may be a distributed computing system. One or more computing devices, such as computing device 102 and/or computing device 120, may access the services provided by the cloud by communicating with computing system 150. While described herein as being performed at least in part by computing system 150, any or all techniques of the present disclosure may be performed by one or more other devices, such as computing device 102 or any of computing devices 120. That is, in some examples, computing device 102 and/or one or more of computing devices 120 may be operable to perform one or more techniques of the present disclosure alone.

Computing system 150 may include gaming performance module 162 and application distribution module 172. Gaming performance module 162 and application distribution module 172 may each perform operations described herein using software, hardware, firmware, or a mixture of both hardware, software, and firmware residing in and executing on computing system 150 or at one or more other remote computing devices. In some examples, gaming performance module 162 and application distribution module 172 may each be implemented as hardware, software, and/or a combination of hardware and software. Computing system 150 may execute gaming performance module 162 and application distribution module 172 with one or more processors. Computing system 150 may execute gaming performance module 162 and/or application distribution module 172 as or within a virtual machine executing on underlying hardware. Gaming performance module 162 and application distribution module 172 may be implemented in various ways. For example, gaming performance module 162 and/or application distribution module 172 may be implemented as a downloadable or pre-installed application or "app." In another example, gaming performance module 162 and/or application distribution module 172 may be implemented as part of an operating system of computing system 150. Other examples of computing system 150 that implement techniques of this disclosure may include additional components not shown in FIG. 1.

Network 130 may be any suitable network that enables communication between computing device 102, computing devices 120, and/or computing system 150. Network 130 may include a wide-area network such as the Internet, a local-area network (LAN), a personal area network (PAN) (e.g., Bluetooth®), an enterprise network, a wireless network, a cellular network, a telephony network, a Metropolitan area network (e.g., WIFI, WAN, WiMAX, etc.), one or more other types of networks, or a combination of two or more different types of networks (e.g., a combination of a cellular network and the Internet).

Computing device 102 and each of computing devices 120 may include, but is not limited to, portable or mobile devices such as mobile phones (including smart phones), laptop computers, tablet computers, wearable computing devices such as smart watches or computerized eyewear, smart television platforms, cameras, computerize appliances, vehicle head units, etc. In some examples, computing device 102 may include stationary computing devices such as desktop computers, servers, mainframes, etc.

Each of computing devices 120 may include gaming application 112 and emulator module 114. Gaming application 112 and emulator module 114 may perform operations described herein using software, hardware, firmware, or a mixture of both hardware, software, and firmware residing in and executing on each of computing devices 120 or at one or more other remote computing devices. In some examples, gaming application 112 and emulator module 114 may be implemented as hardware, software, and/or a combination of hardware and software. Each of computing devices 120 may execute gaming application 112 and emulator module 114 with one or more processors. Gaming application 112 and emulator module 114 may be implemented in various ways. For example, any of gaming application 112 and/or emulator module 114 may be implemented as a downloadable or pre-installed application or "app." In another example, any of gaming application 112 and/or emulator module 114 may be implemented as part of an operating system of each of computing devices 120. Other examples of computing devices 120 that implement techniques of this disclosure may include additional components not shown in FIG. 1.

Computing device 102 may include user interface component 104 ("UIC 104") user interface module 106 ("UI module 106"), emulator module 114, and application catalog module 116. UI module 106, emulator module 114, and application catalog module 116 may perform operations described herein using software, hardware, firmware, or a mixture of both hardware, software, and firmware residing in and executing on computing device 102 or at one or more other remote computing devices. In some examples, UI module 106, emulator module 114, and application catalog module 116 may be implemented as hardware, software, and/or a combination of hardware and software. Computing device 102 may execute UI module 106, emulator module 114, and application catalog module 116 with one or more processors. UI module 106, emulator module 114, and application catalog module 116 may be implemented in various ways. For example, any of module 106, emulator module 114, and/or application catalog module 116 may be implemented as a downloadable or pre-installed application or "app." In another example, any of UI module 106, emulator module 114, and application catalog module 116 may be implemented as part of an operating system of computing device 102. Other examples of computing device 102 that implement techniques of this disclosure may include additional components not shown in FIG. 1.

UIC 104 of computing device 102 may function as an input device for computing device 102 and as an output device. For instance, UIC 104 may function as an input device using a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. UIC 104 may function as an output device using any one or more of a liquid crystal display (LCD), dot matrix display, light emitting diode (LED) display, microLED, organic light-emitting diode (OLED) display, e-ink, or similar monochrome or color display capable of outputting visible information to the user of computing device 102.

In some examples, UIC 104 may include a presence-sensitive screen that may receive tactile user input from a user of computing device 102. UIC 104 may receive the tactile user input by detecting one or more taps and/or gestures from a user of computing device 102 (e.g., the user touching or pointing to one or more locations of UIC 104 with a finger or a stylus pen). The presence-sensitive screen of UIC 104 may present output to a user. UIC 104 may present the output as a user interface, which may be related to functionality provided by computing device 102. For example, UIC 104 may present various functions and applications executing on computing device 102 such as an electronic message application, a messaging application, a map application, etc.

UI module 106 may interpret inputs detected at UIC 104 (e.g., as a user provides one or more gestures at a location of UIC 104 at which a user interface is displayed). UI module 106 may relay information about the inputs detected at UIC 104 to one or more associated platforms, operating systems, applications, and/or services executing at computing device 102 to cause computing device 102 to perform a function. UI module 106 may also receive information and instructions from one or more associated platforms, operating systems, applications, and/or services executing at computing device 102 (e.g., gaming application 112) for generating a graphical user interface (GUI). In addition, UI module 106 may act as an intermediary between the one or more associated platforms, operating systems, applications, and/or services executing at computing device 102 and various output devices of computing device 102 (e.g., speakers, LED indicators, vibrators, etc.) to produce output (e.g., graphical, audible, tactile, etc.) with computing device 102.

Emulator module 114 may execute at computing device 102 and at each of computing devices 120 to provide a virtualized environment that enables applications that are not designed to execute at computing device 102 or computing devices 120 to execute in the virtualized environment provided by emulator module 114 at computing device 102 or computing devices 120. For example, if computing device 102 and each of computing devices 120 are laptop or desktop computing devices that execute a desktop operating system, emulator module 114 may provide a virtualized environment that enables computing applications, such as gaming applications, designed to run on a mobile operating system of smartphones to use emulator module 114 to execute in the virtualized environment provided by emulator module 114 at computing device 102 and each of computing devices 120.

In some examples, emulator module 114 may translate the code (e.g., object code, bytecode, etc.) of an application that is written/and or compiled for different processing architectures and/or different operating systems into code that can be executed at computing device 102 and computing devices 120 or may otherwise provide a virtual execution environment that is different from the execution environment of computing device 102 and computing devices 120 to enable applications that are not designed to execute at computing device 102 or computing devices 120 to execute at computing device 102 or computing devices 120. In some examples, emulator module 114 may implement a virtual machine that emulates the underlying hardware components of a physical computer different from computing device 102 and computing devices 120.

Gaming application 112 may execute in the virtualized environment provided by emulator module 114 at each of computing devices 120 to perform the functionality of a video game. Examples of gaming application 112 may include an action game that may emphasize hand-eye coordination and reaction time, such as a first-person shooter game a simulation game, such as a motorsports simulation game, or a flight simulator game, a role-playing game (e.g., a massive multiplayer role playing game), a networked multi-player game, a single player game, and the like.

As gaming application 112 executes in the virtualized environment provided by emulator module 114 at a computing device, such as at computing device 120A, gaming application 112 may output image data for display at a display device included in or operably coupled to the computing device. Image data, in some examples, may be frames of graphics that gaming application 112 outputs for display at the display device during execution of gaming application 112. For example, the image data may include frames of graphics of the interactive gameplay environment, frames of graphics of loading screens, frames of graphics of menu screens, and the like.

Gaming application 112 may render and output image data according to a target frame rate, such as a target frames per second (fps), at which it is desired that gaming application 112 outputs image data. The frame rate of the image data outputted by gaming application 112 may be the rate at which gaming application 112 outputs frames of graphics. Examples of the frame rate at which gaming application 112 outputs image data may include 30 fps, 60 fps, 120 fps, 144 fps, and the like.

Application catalog module 116 may execute at computing device 102 to download and install applications at computing device 102. For example, application catalog module 116 may download and install applications, such as gaming application 112, that execute in a virtualized environment provided by emulator module 114 at computing device 102. In some examples, application catalog module 116 may output a graphical user interface (GUI) for display at UIC 104 that presents a catalog of applications that may be downloaded and installed computing device 102, such as a list of recommended or featured applications that may be downloaded and installed at computing device 102.

Application catalog module 116 may determine how well a gaming application, such as gaming application 112, is likely to perform when executing in a virtualized environment provided by emulator module 114 at computing device 102 and may determine whether to recommend or feature a gaming application based on the determination of how well the gaming application is likely to perform when executing in a virtualized environment at computing device 102. Application catalog module 116 may determine that a gaming application is likely to perform well if the gaming application is likely to be able to render and output almost all of the frames of image data at the target frame rate of the gaming application when executing in a virtualized environment at computing device 102.

Application catalog module 116 may determine gaming applications that are likely to perform well at computing device 102 and may feature or recommend those gaming applications for installation at computing device 102. Similarly, application catalog module 116 may refrain from featuring or recommending gaming applications that are not likely to perform well at computing device 102. While application catalog module 116 may be able to access Different computing devices may vary in a wide variety of ways, such as by having different central processing units (CPUs) having a different amount of processing cores and/or running at different clock speeds, different graphics processing units (GPUs), different amounts of physical memory size, and the like. While application catalog module 116 may have access to performance data of a gaming application executing on some configurations of computing devices, application catalog module 116 may not have access to performance data of a gaming application executing on the specific configuration of computing device 102.

In accordance with aspects of this disclosure, application catalog module 116 may communicate with computing system 150 to query computing system 150 for a catalog of gaming applications, such as a list of gaming applications that may be able to execute in the virtualized environment provided by emulator module 114 at computing device 102. Application catalog module 116 may include, as part of the query, an indication of one or more device characteristics of computing device 102.

Application distribution module 172 may receive the query from application catalog module 116 and may, in response, determine the list of gaming application that are to be included in the catalog of gaming applications. For example, application distribution module 172 may determine that gaming application 112 is to be listed in the catalog of gaming applications that can be installed at computing device 102.

Application distribution module 172 may determine, for each gaming application to be listed in the catalog that is to be provided to application catalog module 116, a predicted performance of the gaming application when executing at computing device 102. For a gaming application that execute in a virtualized environment provided by emulator module 114, application distribution module 172 may determine a predicted performance of the gaming application when executing in a virtualized environment at computing device 102.

As such, application distribution module 172 may query gaming performance module 162 for a predicted performance of gaming application 112 when executing in a virtualized environment at computing device 102. The query may include one or more device characteristics of computing device 102 and one or more application characteristics of gaming application 112 that gaming performance module 162 may use to determine the one or more application characteristics of gaming application 112.

Gaming performance module 162 may be trained via machine learning to determine, based on the one or more device characteristics of computing device 102 and the one or more application characteristics of gaming application 112, the predicted performance of gaming application 112 when executing in a virtualized environment at computing device 102. In some examples, gaming performance module 162 may implement one or more neural networks trained via machine learning to determine a predicted performance of gaming application 112 when executing at computing device 102. In general, one or more neural networks implemented by gaming performance module 162 may include multiple interconnected nodes, and each node may apply one or more functions to a set of input values that correspond to one or more features, and provide one or more corresponding output values. The one or more features may be one or more device characteristics of computing device 102, and the one or more corresponding output values of one or more neural networks may be an indication of a predicted performance of gaming application 112 when executing at computing device 102.

Gaming performance module 162 is trained to output, based on one or more application characteristics of gaming application 112 and one or more device characteristics of computing device 102, the predicted performance of gaming application 112 when executing in a virtualized environment at computing device 102 in the form of a predicted smoothness score for gaming application 112. The predicted smoothness score may be a value, such as between 0 and 1, that corresponds to the percentage of frames rendered by gaming application 112 that are predicted to meet the frame time of the target frame rate associated with gaming application 112 in the next gameplay session of gaming application 112 when executing in a virtualized environment at computing device 102.

As described above, gaming application 112 may have an associated target frame rate, such as 60 fps, at which it is desired that gaming application 112 outputs image data. The target frame rate may correspond to a frame time, which is the amount of time (e.g., in milliseconds) gaming application 112 is able to take to render a frame of image data in order to render frames of image data quickly enough to meet the target frame rate. In the example where the target frame rate of gaming application 112 is 60 fps, the frame time to render a frame of image data in order to meet the target frame rate of 60 fps would be 16.6 milliseconds. As such, the predicted smoothness score may, for gaming application 112 having a target frame rate of 60 fps, correspond to the percentage of frames of image data rendered by gaming application 112 that are predicted to meet the frame time of 16.6 milliseconds associated with the target frame rate of 60 fps when gaming application 112 executes at computing device 102.

As such, in some examples, gaming performance module 162 may determine the predicted performance of gaming application 112 when executing in a virtualized environment at computing device 102 in the form of a predicted smoothness score. In some examples, gaming performance module 162 may classify the predicted performance of gaming application 112 when executing in a virtualized environment at computing device 102 based on the predicted smoothness score. For example, gaming performance module 162 may compare the predicted smoothness score to a smoothness threshold, which may be a value between 0 and 1, such as 0.80. If gaming performance module 162 determines that the predicted smoothness score is equal to or greater than the smoothness threshold, gaming performance module 162 may determine that gaming application 112 may perform well when executing in a virtualized environment at computing device 102. If gaming performance module 162 determines that the predicted smoothness score is less than the smoothness threshold, gaming performance module 162 may determine that gaming application 112 may not perform well when executing in a virtualized environment at computing device 102.

Computing system 150 may train the one or more neural networks of gaming performance module 162 using training data that is generated from monitoring the performance of gaming application 112 executing at virtualized environments provided by emulator module 114 at a population of computing devices, such as computing devices 120, that may have a variety of different device configurations and/or device characteristics. As gaming application 112 executing at virtualized environments provided by emulator module 114 at computing devices 120, computing system 150 may receive, from computing devices 120, performance metrics associated with execution of gaming application 112 at computing devices 120. Such performance metrics may include, for each frame of image data rendered by gaming application 112, the amount of time taken by gaming application 112 to render the frame of image data.

Computing system 150 may use the collected performance metrics to determine, for each gameplay session of gaming application 112 executing at virtualized environments provided by emulator module 114 at computing devices 120, a smoothness score associated with the gameplay session. The smoothness score associated with a gameplay session may be the percentage of frames of image data rendered by gaming application 112 during the gameplay session that meet the frame time of the target frame rate associated with gaming application 112, where a gameplay session may span gaming application 112 beginning execution (e.g., opening gaming application 112) until gaming application 112 stops execution (e.g., until quitting gaming application 112) at a computing device of computing devices 120.

As such, computing system 150 may generate training data for training the one or more neural networks of gaming performance module 162 that include, for each gameplay session of a plurality of gameplay sessions at computing devices 120, a corresponding smoothness score associated with one or more device characteristics of the computing device at which the gameplay session takes place. Computing system 150 may therefore train the one or more neural networks of gaming performance module 162 using the training data to be able to predict performance scores of gaming application 112 when executing in virtualized environments at computing devices.

Gaming performance module 162 may, in response to determining the predicted performance of gaming application 112 when executing in a virtualized environment at computing device 102, send an indication of the predicted performance of gaming application 112 to application distribution module 172. Application distribution module 172 may therefore send, to computing device 102, an indication of the predicted performance of gaming application 112. For example, application distribution module 172 may send, to computing device 102, a catalog that lists gaming applications, including gaming application 112, that can be downloaded and installed at computing device 102, and the catalog may include an indication of the predicted performance of gaming application 112.

Application catalog module 116 may receive the catalog of gaming applications from application distribution module 172 of computing system 150 and may output a GUI, such as for display at UIC 104 that presents the gaming applications listed in the catalog for download and installation at computing device 102. Application catalog module 116 may present, in the GUI, a list of one or more recommended gaming applications and/or one or more featured applications in a visually prominent position in the GUI, such as at the top of a front page in the GUI.

Application catalog module 116 may determine whether to feature or recommend gaming application 112 in the GUI based on the predicted performance of gaming application 112 when executing in a virtualized environment at computing device 102. In examples where the predicted performance of gaming application 112 when executing in a virtualized environment at computing device 102 is in the form of a predicted smoothness score, application catalog module 116 may compare the predicted smoothness score to a smoothness threshold, which may be a value between 0 and 1, such as 0.80. Application catalog module 116 determines that the predicted smoothness score is equal to or greater than the smoothness threshold, application catalog module 116 may determine that gaming application 112 may perform well when executing in a virtualized environment at computing device 102. If application catalog module 116 determines that the predicted smoothness score is less than the smoothness threshold, application catalog module 116 may determine that gaming application 112 may not perform well when executing in a virtualized environment at computing device 102.

Application catalog module 116 may, in response to determining that gaming application 112 is predicted to perform well when executing in a virtualized environment at computing device 102, feature or otherwise recommend gaming application 112 for installation at computing device 102, such as by including an indication of gaming application 112 in a list of featured or recommended application in a GUI and/or by presenting a visual indication of gaming application 112 in a visually prominent position in the GUI, such as at the top of a front page in the GUI. Similarly, application catalog module 116 may, in response to determining that gaming application 112 is predicted to not perform well when executing in a virtualized environment at computing device 102, refrain from featuring or otherwise recommending gaming application 112 for installation at computing device 102.

In some examples, computing device 102 may, in response to determining that gaming application 112 is predicted to not perform well when executing in a virtualized environment at computing device 102, adjust one or more graphics settings of gaming application 112 that is installed at computing device 102 to improve the performance of gaming application 112 when executing in a virtualized environment at computing device 102. For example, computing device 102 may decrease the resolution of frames of image data outputted by computing device 102, reduce the number of textures rendered by gaming application 112, reduce the complexity of graphics rendered by gaming application 112, and the like.

If computing device 102 downloads and installs gaming application 112, computing system 150 may monitor the performance of gaming application 112 during execution in a virtualized environment at computing device 102. For example, computing system 150 may monitor the performance metrics of gaming application 112 during execution in a virtualized environment at computing device 102 to determine the actual performance of gaming application 112, such as the actual smoothness scores of gaming application 112 during execution in a virtualized environment at computing device 102. Computing system 150 may re-train or perform fine tuning of the one or more neural networks of gaming performance module 162 based on the actual performance of gaming application 112, such as the actual smoothness scores of gaming application 112 during execution in a virtualized environment at computing device 102 to be able to more accurately determine the predicted performance of gaming application 112 when executing in virtualized environments of computing devices.

The techniques of this disclosure provide one or more technical advantages. An emulator that provides a virtualized environment for a gaming application may enable the gaming application to execute at a wide variety of different computing devices having operating systems and/or processing architectures that are different from the operating system and/or processing architecture for which the gaming application was designed. As such, it may be difficult for a computing system to gather performance data of the gaming application when executing at such a wide variety of different configurations of operating systems and/or processing architectures at which the gaming application to execute. By using one or more neural networks trained using machine learning to determine the predicted performance of a gaming application at a computing device, the techniques of this disclosure may enable a computing system to more accurately predict the performance of the gaming application when executing at a computing device even if the computing system does not have any performance data about the performance of the gaming application executing at the specific configuration of the computing device, thereby improving the technical field of predicting the performance of gaming applications.

Figure 2:
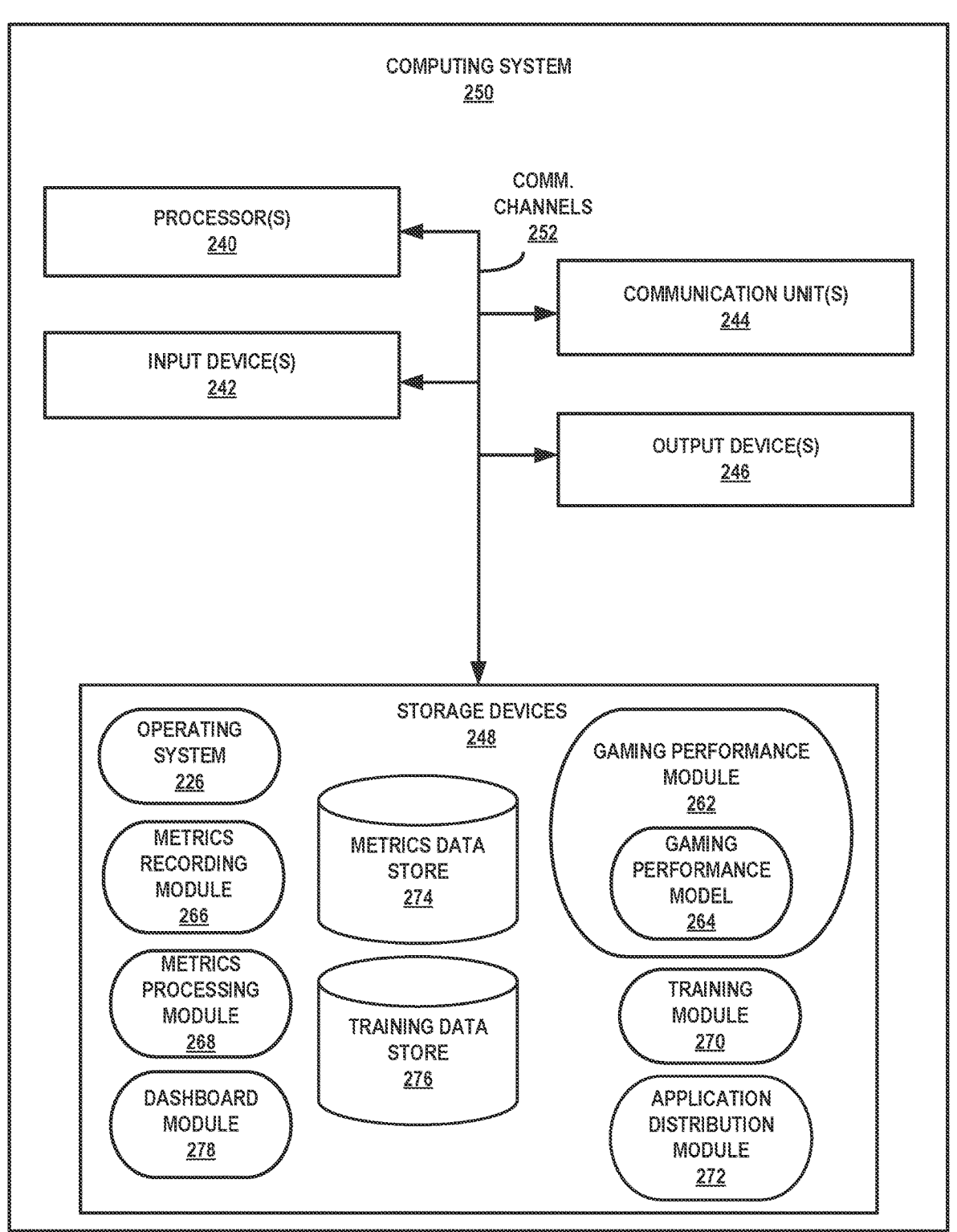
FIG. 2 is a block diagram illustrating an example computing system, in accordance with one or more aspects of the present disclosure.

Furthermore, by using one or more neural networks trained using machine learning to determine the predicted performance of a gaming application at a computing device, the techniques of this disclosure may enable a computing device to, in response to determining that the gaming application is not predicted to perform well at the computing device, adjust one or more parameters of the gaming application, such as the graphics qualify of the gaming application, in order to increase the performance of the gaming application when executing at the computing device. This may improve the user experience of the gaming application executing at the computing device by ensuring that the gaming application is perceived to be smooth and responsive by users FIG. 2 is a block diagram illustrating an example computing system, in accordance with one or more aspects of the present disclosure. FIG. 2 illustrates only one particular example of computing system 250, and many other examples of computing system 250 may be used in other instances and may include a subset of the components included in example computing system 250 or may include additional components not shown in FIG. 2. Computing system 250 may be an example of computing system 150 of FIG. 1.

As shown in the example of FIG. 2, computing system 250 includes one or more processors 240, one or more input devices 242, one or more communication units 244, one or more output devices 246, and one or more storage devices 248. One or more processors 240 may be an example of one or more processors 108 of FIG. 1. One or more input devices 242 and one or more output device 246 may be examples of UIC 104 of FIG. 1. Storage devices 248 of computing system 250 also include operating system 226, and gaming performance module 262. Communication channels 252 may interconnect each of the components 240, 242, 244, 246, and 248 for inter-component communications (physically, communicatively, and/or operatively). In some examples, communication channels 252 may include a system bus, a network connection, one or more inter-process communication data structures, or any other components for communicating data between hardware and/or software.

One or more processors 240 may implement functionality and/or execute instructions within computing system 250. For example, processors 240 on computing device 102 may receive and execute instructions stored by storage devices 248 that provide the functionality of operating system 226, gaming performance module 262, metrics recording module 266, metrics processing module 268, training module 270, application distribution module 272, and dashboard module 278. These instructions executed by processors 240 may cause computing system 250 to store and/or modify information, within storage devices 48 during program execution. Processors 240 may execute instructions of operating system, gaming performance module 262, metrics recording module 266, metrics processing module 268, training module 270, application distribution module 272, and dashboard module 278. That is, operating system 226, gaming performance module 262, metrics recording module 266, metrics processing module 268, training module 270, application distribution module 272, and dashboard module 278 may be operable by processors 240 to perform various functions described herein.

One or more processors 240 may be or include a digital signal processor (DSP), a general purpose microprocessor, application specific integrated circuit (ASIC), field programmable logic array (FPGA), and/or other equivalent integrated or discrete logic circuitry. One or more input devices 242 of computing system 250 may receive input. Examples of input are tactile, audio, kinetic, and optical input, to name only a few examples. One or more output devices 246 of computing device 102 may generate output. Examples of output are tactile, audio, and video output.

One or more communication units 244 of computing system 250 may communicate with external devices by transmitting and/or receiving data. For example, computing system 250 may use communication units 244 to transmit and/or receive radio signals on a radio network such as a cellular radio network. In some examples, communication units 244 may transmit and/or receive satellite signals on a satellite network such as a Global Positioning System (GPS) network. Examples of communication units 244 include a network interface card (e.g., such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers and the like.

One or more storage devices 248 within computing system 250 may store information for processing during operation of computing system 250. In some examples, storage device 248 is a temporary memory, meaning that a primary purpose of storage device 248 is not long-term storage. Storage devices 248 on computing system 250 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 248, in some examples, also include one or more computer-readable storage media. Storage devices 248 may be configured to store larger amounts of information than volatile memory. Storage devices 248 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 248 may store program instructions and/or data associated with operating system 226, gaming performance module 262, metrics recording module 266, metrics processing module 268, training module 270, application distribution module 272, and dashboard module 278.

In accordance with techniques of the disclosure, computing system 250 is configured to receive, via one or more communication units 244 from a computing device (e.g., computing device 102 shown in FIG. 1), an indication of one or more device characteristics of the computing device. For example, one or more processors 240 are configured to execute application distribution module 272 to receive, from the computing device, a query for a catalog of gaming applications that can be installed at the computing device, and the query received from the computing device may include the one or more device characteristics of the computing device.

The indication of one or more device characteristics of the computing device may include an indication of one or more CPU characteristics of the computing device. The one or more CPU characteristics of the computing device may include any combination of the number of CPUs of the computing device, the number of physical processing cores of the one or more CPUs, the number of logical processing cores of the one or more CPUs, the model of the one or more CPUs, and/or the clock speed of the one or more CPUs, such as the initial clock speed (e.g., the base clock speed or nominal clock speed) of the one or more CPUs and/or the maximum clock speed of the one or more CPUs.

The indication of one or more device characteristics of the computing device may also include an indication of one or more GPU characteristics of the computing device. The one or more GPU characteristics of the computing device may include any combination of the manufacturer (e.g., the manufacturer name) of the one or more GPUs of the computing device and/or an indication of the model of the one or more GPUs of the computing device, the video RAM (VRAM) size of the one or more GPUs, the memory bandwidth of the one or more GPUs, the current clock speed of the one or more GPUs, the maximum clock speed of the one or more GPUs, the size of heaps allocated in the memory of the one or more GPUs, and/or the version number of the GPU driver installed at the computing device.

The indication of the one or more device characteristics of computing device may also include an indication of one or more memory characteristics of the computing device. The one or more memory characteristics of the computing device may include any combination of an amount of memory of the computing device, such as the total amount of physical RAM installed at the computing device, the type of disks at computing device, the amount of available physical RAM at the computing device, the number and/or details of physical channels of the RAM at the computing device, and/or the clock speed of the RAM at the computing device.

The indication of the one or more device characteristics of the computing device may, in some examples, also include an indication of the version of the operating system of the computing device and/or a language (e.g., English, French, etc.) for which of the operating system is localized.

In some examples, the indication of the one or more device characteristics of the computing device may include one or more display characteristics of the computing device. The one or more display characteristics of the computing device may include any combination of the display resolution of the display (e.g., UIC 104 shown in FIG. 1) of the computing device and/or the refresh rate of the display.

In examples where the gaming application would execute at the computing device using in a virtualized environment using an emulator (e.g., emulator module 114 shown in FIG. 1), the indication of the one or more device characteristics of the computing device may include an indication of one or more characteristics of the emulator that would be used to execute the gaming application at the computing device. The one or more characteristics of the emulator may include any combination of the version of the emulator, the total memory size of the emulator, which may be the total amount of memory of the computing device that is able to be used and/or is allocated by the emulator, and/or the available memory size of the emulator, which may be the amount of memory of the computing device that is available for use by the emulator.

One or more processors 240 are configured to execute application distribution module 272 to query, for each of a plurality of gaming applications to be included in a catalog of gaming applications to be sent to the computing device, gaming performance module 262 for a predicted performance of the gaming application when executing in a virtualized environment (e.g., a virtualized environment provided by emulator module 114 shown in FIG. 1) at the computing device. For example, application distribution module 272 may send a query to gaming performance module 262 for a predicted performance of gaming application 112 shown in FIG. 1 when executing in a virtualized environment at the computing device. The query may include an indication of the one or more device characteristics of the computing device, as received from the computing device.

In some examples, the query may include an indication of one or more application characteristics of the gaming application. The indication of one or more application characteristics of the gaming application may include an indication of the name of the gaming application, such as the software package name of the gaming application, and/or, a software package version number associated with the gaming application. In some examples, the one or more application characteristics of the gaming application may also include any combination of the graphics application programming interface (API) used by the gaming application, such as whether the gaming application is using a cross-platform graphics API (e.g., Vulkan ANGLE) that is translated to a native graphics API of the computing device or whether the gaming application is using a graphics API that is native to the computing device (e.g., Direct3D), the game engine used by the gaming application, the resolution of frames of image data outputted by the gaming application, and/or the operating system and/or processor architecture at which the gaming application is designed to execute.

One or more processors 240 of computing system 250 are configured to execute gaming performance module 262 to determine, based on the one or more device characteristics of the computing device and one or more application characteristics of the gaming application, a predicted performance of the gaming application when executing in a virtualized environment at the computing device. That is, computing system 250 may use gaming performance module 262 to predict how well the gaming application would perform if the gaming application were to execute at the computing device.

The predicted performance of a gaming application when executing in a virtualized environment at a computing device may be a value that corresponds to how well the gaming application is likely to perform when executing in the virtualized environment at the computing device. In some examples, the predicted performance may include or correspond to frame rate information. The frame rate information, in some examples, includes a frame time, which is the amount of time (e.g., in milliseconds) the gaming application is predicted to take in order to render a frame of image data while executing at the computing device.

In some examples, one or more processors 240 are configured to execute gaming performance module 262 to determine a predicted performance of the gaming application when executing at the computing device in the form of a predicted smoothness score. The predicted smoothness score may be a value, such as between 0 and 1, that corresponds to the percentage of frames of image data rendered by the gaming application when executing at the computing device that are predicted to meet the frame time of the target frame rate associated with the gaming application in the next gameplay session. For example, a predicted smoothness score of 0.5 may indicate that 50% of the frames of image data rendered by the gaming application when executing at the computing device are predicted to meet the frame time of the target frame rate associated with the gaming application in the next gameplay session As described above, A gaming application may have an associated target frame rate, such as 60 fps, at which it is desired that the gaming application outputs rendered image data. The target frame rate may correspond to a frame time, which is the amount of time (e.g., in milliseconds) the gaming application is able to take to render a frame of image data in order to render frames of image data quickly enough to meet the target frame rate. In the example where the target frame rate of the gaming application is 60 fps, the frame time to render a frame of image data in order to meet the target frame rate of 60 fps would be 16.6 milliseconds. As such, the predicted smoothness score may, for the gaming application having a target frame rate of 60 fps, correspond to the percentage of frames of image data rendered by the gaming application that are predicted to meet the target frame rate of 60 fps when the gaming application executes at the computing device.

In some examples, one or more processors 240 are configured to execute gaming performance module 262 to determine a predicted performance of the gaming application when executing at the computing device in the form of a predicted smoothness score One or more processors 240 are configured to execute gaming performance module 262 to, in response to determining the predicted performance of the gaming application when executing at the computing device, send an indication of the predicted performance of the gaming application to application distribution module 272. One or more processors 240 are configured to execute application distribution module 272 to generate a catalog of gaming applications that includes, for each gaming application in the catalog, an indication of an associated predicted performance of the gaming application when executing at the computing device. Application distribution module 272 may therefore send, using one or more communication units 244 to the computing device, the catalog of gaming applications, thereby sending, to the computing device, an indication of an associated predicted performance of the gaming application when executing at the computing device.

In some examples, gaming performance module 262 may include gaming performance model 264 that implements one or more neural networks trained via machine learning to determine a predicted performance of a gaming application when executing in a virtualized environment at a computing device. In general, one or more neural networks implemented by gaming performance model 264 may include multiple interconnected nodes, and each node may apply one or more functions to a set of input values that correspond to one or more features, and provide one or more corresponding output values. The one or more features may include an indication of one or more application characistics of the gaming application and an indication of one or more device characteristics of the computing device, and the one or more corresponding output values of one or more neural networks may be an indication of a predicted performance, such as a predicted smoothness score, of the gaming application when executing in a virtualized environment at the computing device.

Gaming performance model 264 may be trained to determine a predicted performance of a gaming application (e.g., gaming application 112 shown in FIG. 1) when executing at a computing device (e.g., computing device 102 shown in FIG. 1) using training data that includes data collected from a population of computing devices (e.g., computing devices 120 shown in FIG. 1) that each executes a copy of the same gaming application (e.g., gaming application 112 shown in FIG. 1). The data collected from the population of computing devices may include, for each of the population of computing devices, one or more device characteristics of the corresponding computing device, such as the one or more device characteristics described above.

The data collected from the population of computing devices may include, for each of the population of computing devices may also include performance metrics of the gaming application executing at the population of computing devices. As copies of the gaming application executes at the population of computing devices, one or more processors 240 are configured to execute metrics recording module 266 to receive, from the population of computing devices, performance metrics of the copies of the gaming application, and metrics recording module 266 may store the received performance metrics in metrics data store 274, which may be any suitable structured data store such as a database.

The performance metrics received from the population of computing devices may include frame time metrics regarding frames of image data rendered and outputted by copies of the gaming application executing at the population of computing devices, such as the frame time of each frame of image data rendered and outputted by each copy of the gaming application executing at the population of computing devices. The performance metrics may also include indications of the start of gameplay sessions and indications of the end of gameplay sessions by each copy of the gaming application executing at the population of computing devices.

One or more processors 240 are configured to execute metrics processing module 268 to perform processing of the performance metrics stored in metrics data store 274. Metrics processing module 268 may use the indications of the start of gameplay sessions and the indications of the end of gameplay sessions to group the received frame time metrics by gameplay sessions to determine per-gameplay session frame time metrics. That is, metrics processing module 268 may, for each gameplay session of the copies of the gaming application executing at the population of computing devices, the frame time metrics of the frames rendered by a copy of the gaming application during that gameplay session.

Metrics processing module 268 may therefore determine, for each gameplay session of the copies of the gaming application executing at the population of computing devices, a smoothness score associated with the gameplay session based on the frame time metrics associated with the gameplay session. For example, metrics processing module 268 may calculate a smoothness score for the gameplay session as the percentage of frames of image data rendered and outputted by the corresponding copy of the gaming application during the gameplay session that meets the frame time of a target frame rate associated with the gaming application.

Metrics processing module 268 may store, for each gameplay session of the copies of the gaming application executing at the population of computing devices, the smoothness score associated with the gameplay session, the one or more device characteristics of the computing device at which the gameplay session occurred, and a unique gameplay session identifier, in training data store 276, which may be any suitable structured data store such as a database or a table. In this way, computing system 250 may generate a set of training data that includes associations between device characteristics of computing devices and per-gameplay session smoothness scores, and one or more processors 40 may be configured to execute training module 270 to train gaming performance model 264 to predict the performance of the gaming application when executing at a computing device via any suitable machine learning technique.

In some examples, computing system 250 may continue to collect data, such as frame time metrics and device characteristics, from a population of computing devices (e.g., computing devices 120 shown in FIG. 1) that each executes a copy of the same gaming application (e.g., gaming application 112), and training module 270 may use the collected data to periodically re-train or to fine tune gaming performance model 264 based on the collected data.

For example, as discussed above, metrics processing module 268 may determine, from the collected data, smoothness scores associated with each of a plurality of gameplay sessions. Gaming performance model 264 may also determine, for each of the plurality of gameplay sessions, a predicted performance, such as a predicted smoothness score, based on one or more device characteristics associated with the gameplay session. Training module 270 may therefore re-train or fine tune gaming performance model 264 via any suitable machine learning techniques to minimize, for each gameplay session, the difference between the smoothness score associated with the gaming session and the predicted smoothness score for the gaming session.

In some examples, one or more processors 240 are configured to execute dashboard module 278 to output, such as for display at a display device of one or more output devices 246 or to an external computing device, a model accuracy dashboard. The model accuracy dashboard may present, for each gameplay session of a plurality of gameplay sessions of a gaming application, the actual smoothness score associated with the gameplay session with the predicted smoothness score predicted using gaming performance model 264, thereby enabling users, such as developers of gaming performance model 264 to visualize the performance of gaming performance model 264.

FIGS. 3A through 3E are conceptual diagrams illustrating aspects of an example machine-learned model according to example implementations of the present disclosure. FIGS. 3A through 3E are described below in the context of gaming performance model 264 of FIG. 2. For example, in some instances, machine-learned model 322, as referenced below, may be an example of gaming performance model 264.

Figure 3A:
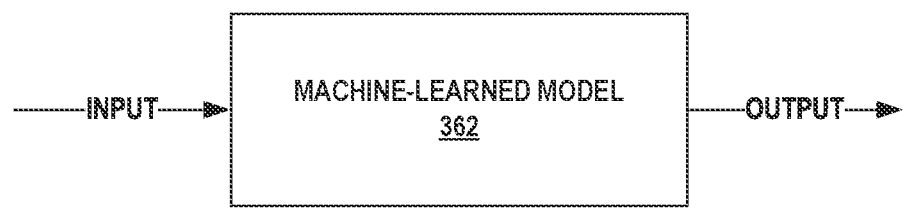
FIGS. 3A-3E are conceptual diagrams illustrating aspects of an example machine-learned model according to example implementations of the present disclosure.

FIG. 3A depicts a conceptual diagram of an example machine-learned model according to example implementations of the present disclosure. As illustrated in FIG. 3A, in some implementations, machine-learned model 322 is trained to receive input data of one or more types and, in response, provide output data of one or more types. Thus, FIG. 3A illustrates machine-learned model 322 performing inference.

The input data may include one or more features that are associated with an instance or an example. In some implementations, the one or more features associated with the instance or the example can be organized into a feature vector. For example, gaming performance model 264 may receive a feature vector that includes one or more features of a gaming application and a feature vector that includes one or more features of a computing device. In some implementations, the output data can include one or more predictions. Predictions can also be referred to as inferences. Thus, given features associated with a particular instance, machine-learned model 322 can output a prediction for such instance based on the features. For example, given a feature vector that includes one or more features of a gaming application and a feature vector that includes one or more features of a computing device, gaming performance model 264 may output a predicted performance of the gaming application when executing at the computing device.

Machine-learned model 322 can be or include one or more of various different types of machine-learned models. In particular, in some implementations, machine-learned model 322 can perform classification, regression, clustering, anomaly detection, recommendation generation, and/or other tasks.

In some implementations, machine-learned model 322 can perform various types of classification based on the input data. For example, machine-learned model 322 can perform binary classification or multiclass classification. In binary classification, the output data can include a classification of the input data into one of two different classes. In multiclass classification, the output data can include a classification of the input data into one (or more) of more than two classes. The classifications can be single label or multi-label. Machine-learned model 322 may perform discrete categorical classification in which the input data is simply classified into one or more classes or categories.

In some implementations, machine-learned model 322 can perform regression to provide output data in the form of a continuous numeric value. The continuous numeric value can correspond to any number of different metrics or numeric representations, including, for example, currency values, scores (e.g., performance scores), or other numeric representations. As examples, machine-learned model 322 can perform linear regression, polynomial regression, or nonlinear regression. As examples, machine-learned model 322 can perform simple regression or multiple regression. As described above, in some implementations, a Softmax function or other function or layer can be used to squash a set of real values respectively associated with a two or more possible classes to a set of real values in the range (0, 1) that sum to one.

Machine-learned model 322 may perform various types of clustering. For example, machine-learned model 322 can identify one or more previously defined clusters to which the input data most likely corresponds. Machine-learned model 322 may identify one or more clusters within the input data. That is, in instances in which the input data includes multiple objects, documents, or other entities, machine-learned model 322 can sort the multiple entities included in the input data into a number of clusters. In some implementations in which machine-learned model 322 performs clustering, machine-learned model 322 can be trained using unsupervised learning techniques.

Machine-learned model 322 may perform anomaly detection or outlier detection. For example, machine-learned model 322 can identify input data that does not conform to an expected pattern or other characteristic (e.g., as previously observed from previous input data). As examples, the anomaly detection can be used for fraud detection or system failure detection.

In some implementations, machine-learned model 322 can provide output data in the form of one or more recommendations. For example, machine-learned model 322 can be included in a recommendation system or engine. As an example, given input data that describes previous outcomes for certain entities (e.g., a score, ranking, or rating indicative of an amount of success or enjoyment), machine-learned model 322 can output a suggestion or recommendation of one or more additional entities that, based on the previous outcomes, are expected to have a desired outcome (e.g., elicit a score, ranking, or rating indicative of success or enjoyment).

In some implementations, machine-learned model 322 can be a parametric model while, in other implementations, machine-learned model 322 can be a non-parametric model. In some implementations, machine-learned model 322 can be a linear model while, in other implementations, machine-learned model 322 can be a non-linear model.

As described above, machine-learned model 322 can be or include one or more of various different types of machine-learned models. Examples of such different types of machine-learned models are provided below for illustration. One or more of the example models described below can be used (e.g., combined) to provide the output data in response to the input data. Additional models beyond the example models provided below can be used as well.

In some implementations, machine-learned model 322 can be or include one or more classifier models such as, for example, linear classification models; quadratic classification models; etc. Machine-learned model 322 may be or include one or more regression models such as, for example, simple linear regression models; multiple linear regression models; logistic regression models; stepwise regression models; multivariate adaptive regression splines; locally estimated scatterplot smoothing models; etc.

In some examples, machine-learned model 322 can be or include one or more decision tree-based models such as, for example, classification and/or regression trees; iterative dichotomiser 3 decision trees; C4.5 decision trees; chi-squared automatic interaction detection decision trees; decision stumps; conditional decision trees; etc.

Machine-learned model 322 may be or include one or more kernel machines. In some implementations, machine-learned model 322 can be or include one or more support vector machines. Machine-learned model 322 may be or include one or more instance-based learning models such as, for example, learning vector quantization models; self-organizing map models; locally weighted learning models; etc. In some implementations, machine-learned model 322 can be or include one or more nearest neighbor models such as, for example, k-nearest neighbor classifications models; k-nearest neighbors regression models; etc. Machine-learned model 322 can be or include one or more Bayesian models such as, for example, naïve Bayes models; Gaussian naïve Bayes models; multinomial naïve Bayes models; averaged one-dependence estimators; Bayesian networks; Bayesian belief networks; hidden Markov models; etc.

In some implementations, machine-learned model 322 can be or include one or more artificial neural networks (also referred to simply as neural networks). A neural network can include a group of connected nodes, which also can be referred to as neurons or perceptrons. A neural network can be organized into one or more layers. Neural networks that include multiple layers can be referred to as "deep" networks. A deep network can include an input layer, an output layer, and one or more hidden layers positioned between the input layer and the output layer. The nodes of the neural network can be connected or non-fully connected.

Machine-learned model 322 can be or include one or more feed forward neural networks. In feed forward networks, the connections between nodes do not form a cycle. For example, each connection can connect a node from an earlier layer to a node from a later layer.

In some instances, machine-learned model 322 can be or include one or more recurrent neural networks. In some instances, at least some of the nodes of a recurrent neural network can form a cycle. Recurrent neural networks can be especially useful for processing input data that is sequential in nature. In particular, in some instances, a recurrent neural network can pass or retain information from a previous portion of the input data sequence to a subsequent portion of the input data sequence through the use of recurrent or directed cyclical node connections.

In some examples, sequential input data can include time-series data (e.g., sensor data versus time or imagery captured at different times). For example, a recurrent neural network can analyze sensor data versus time to detect or predict a swipe direction, to perform handwriting recognition, etc. Sequential input data may include words in a sentence (e.g., for natural language processing, speech detection or processing, etc.); notes in a musical composition; sequential actions taken by a user (e.g., to detect or predict sequential application usage); sequential object states; etc.

Example recurrent neural networks include long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations; etc.

In some implementations, machine-learned model 322 can be or include one or more convolutional neural networks. In some instances, a convolutional neural network can include one or more convolutional layers that perform convolutions over input data using learned filters.

Filters can also be referred to as kernels. Convolutional neural networks can be especially useful for vision problems such as when the input data includes imagery such as still images or video. However, convolutional neural networks can also be applied for natural language processing.

In some examples, machine-learned model 322 can be or include one or more generative networks such as, for example, generative adversarial networks. Generative networks can be used to generate new data such as new images or other content.

Machine-learned model 322 may be or include an autoencoder. In some instances, the aim of an autoencoder is to learn a representation (e.g., a lower-dimensional encoding) for a set of data, typically for the purpose of dimensionality reduction. For example, in some instances, an autoencoder can seek to encode the input data and the provide output data that reconstructs the input data from the encoding. Recently, the autoencoder concept has become more widely used for learning generative models of data. In some instances, the autoencoder can include additional losses beyond reconstructing the input data.

Machine-learned model 322 may be or include one or more other forms of artificial neural networks such as, for example, deep Boltzmann machines; deep belief networks;

stacked autoencoders; etc. Any of the neural networks described herein can be combined (e.g., stacked) to form more complex networks.

One or more neural networks can be used to provide an embedding based on the input data. For example, the embedding can be a representation of knowledge abstracted from the input data into one or more learned dimensions. In some instances, embeddings can be a useful source for identifying related entities. In some instances, embeddings can be extracted from the output of the network, while in other instances embeddings can be extracted from any hidden node or layer of the network (e.g., a close to final but not final layer of the network). Embeddings can be useful for performing auto suggest next video, product suggestion, entity or object recognition, etc. In some instances, embeddings be useful inputs for downstream models. For example, embeddings can be useful to generalize input data (e.g., search queries) for a downstream model or processing system.

Machine-learned model 322 may include one or more clustering models such as, for example, k-means clustering models; k-medians clustering models; expectation maximization models; hierarchical clustering models; etc.

In some implementations, machine-learned model 322 can perform one or more dimensionality reduction techniques such as, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, machine-learned model 322 can perform or be subjected to one or more reinforcement learning techniques such as Markov decision processes; dynamic programming; Q functions or Q-learning; value function approaches; deep Q-networks; differentiable neural computers; asynchronous advantage actor-critics; deterministic policy gradient; etc.

In some implementations, machine-learned model 322 can be an autoregressive model. In some instances, an autoregressive model can specify that the output data depends linearly on its own previous values and on a stochastic term. In some instances, an autoregressive model can take the form of a stochastic difference equation. One example of an autoregressive model is WaveNet, which is a generative model for raw audio.

In some implementations, machine-learned model 322 can include or form part of a multiple model ensemble. As one example, bootstrap aggregating can be performed, which can also be referred to as "bagging." In bootstrap aggregating, a training dataset is split into a number of subsets (e.g., through random sampling with replacement) and a plurality of models are respectively trained on the number of subsets. At inference time, respective outputs of the plurality of models can be combined (e.g., through averaging, voting, or other techniques) and used as the output of the ensemble.

One example ensemble is a random forest, which can also be referred to as a random decision forest. Random forests are an ensemble learning method for classification, regression, and other tasks. Random forests are generated by producing a plurality of decision trees at training time. In some instances, at inference time, the class that is the mode of the classes (classification) or the mean prediction (regression) of the individual trees can be used as the output of the forest. Random decision forests can correct for decision trees' tendency to overfit their training set.

Another example ensemble technique is stacking, which can, in some instances, be referred to as stacked generalization. Stacking includes training a combiner model to blend or otherwise combine the predictions of several other machine-learned models. Thus, a plurality of machine-learned models (e.g., of same or different type) can be trained based on training data. In addition, a combiner model can be trained to take the predictions from the other machine-learned models as inputs and, in response, produce a final inference or prediction. In some instances, a single-layer logistic regression model can be used as the combiner model.

Another example of ensemble technique is boosting. Boosting can include incrementally building an ensemble by iteratively training weak models and then adding to a final strong model. For example, in some instances, each new model can be trained to emphasize the training examples that previous models misinterpreted (e.g., misclassified). For example, a weight associated with each of such misinterpreted examples can be increased. One common implementation of boosting is AdaBoost, which can also be referred to as Adaptive Boosting. Other example boosting techniques include LPBoost; TotalBoost; BrownBoost; xgboost; MadaBoost, LogitBoost, gradient boosting; etc. Furthermore, any of the models described above (e.g., regression models and artificial neural networks) can be combined to form an ensemble. As an example, an ensemble can include a top level machine-learned model or a heuristic function to combine and/or weight the outputs of the models that form the ensemble.

In some implementations, multiple machine-learned models (e.g., that form an ensemble can be linked and trained jointly (e.g., through backpropagation of errors sequentially through the model ensemble). However, in some implementations, only a subset (e.g., one) of the jointly trained models is used for inference.

In some implementations, machine-learned model 322 can be used to preprocess the input data for subsequent input into another model. For example, machine-learned model 322 can perform dimensionality reduction techniques and embeddings (e.g., matrix factorization, principal components analysis, singular value decomposition, word2vec/GLOVE, and/or related approaches); clustering; and even classification and regression for downstream consumption. Many of these techniques have been discussed above and will be further discussed below.

As discussed above, machine-learned model 322 can be trained or otherwise configured to receive the input data and, in response, provide the output data. The input data can include different types, forms, or variations of input data. As examples, in various implementations, the input data can include features that describe the content (or portion of content) initially selected by the user, e.g., content of user-selected document or image, links pointing to the user selection, links within the user selection relating to other files available on device or cloud, metadata of user selection, etc. Additionally, with user permission, the input data includes the context of user usage, either obtained from app itself or from other sources. Examples of usage context include breadth of share (sharing publicly, or with a large group, or privately, or a specific person), context of share, etc. When permitted by the user, additional input data can include the state of the device, e.g., the location of the device, the apps running on the device, etc.

In some implementations, machine-learned model 322 can receive and use the input data in its raw form. In some implementations, the raw input data can be preprocessed. Thus, in addition or alternatively to the raw input data, machine-learned model 322 can receive and use the preprocessed input data.

In some implementations, preprocessing the input data can include extracting one or more additional features from the raw input data. For example, feature extraction techniques can be applied to the input data to generate one or more new, additional features. Example feature extraction techniques include edge detection; corner detection; blob detection; ridge detection; scale-invariant feature transform; motion detection; optical flow; Hough transform; etc.

In some implementations, the extracted features can include or be derived from transformations of the input data into other domains and/or dimensions. As an example, the extracted features can include or be derived from transformations of the input data into the frequency domain. For example, wavelet transformations and/or fast Fourier transforms can be performed on the input data to generate additional features.

In some implementations, the extracted features can include statistics calculated from the input data or certain portions or dimensions of the input data. Example statistics include the mode, mean, maximum, minimum, or other metrics of the input data or portions thereof.

In some implementations, as described above, the input data can be sequential in nature. In some instances, the sequential input data can be generated by sampling or otherwise segmenting a stream of input data. As one example, frames can be extracted from a video. In some implementations, sequential data can be made non-sequential through summarization.

As another example preprocessing technique, portions of the input data can be imputed. For example, additional synthetic input data can be generated through interpolation and/or extrapolation.

As another example preprocessing technique, some or all of the input data can be scaled, standardized, normalized, generalized, and/or regularized. Example regularization techniques include ridge regression; least absolute shrinkage and selection operator (LASSO); elastic net; least-angle regression; cross-validation; L1 regularization; L2 regularization; etc. As one example, some or all of the input data can be normalized by subtracting the mean across a given dimension's feature values from each individual feature value and then dividing by the standard deviation or other metric.

As another example preprocessing technique, some or all or the input data can be quantized or discretized. In some cases, qualitative features or variables included in the input data can be converted to quantitative features or variables. For example, one hot encoding can be performed.

In some examples, dimensionality reduction techniques can be applied to the input data prior to input into machine-learned model 322. Several examples of dimensionality reduction techniques are provided above, including, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, during training, the input data can be intentionally deformed in any number of ways to increase model robustness, generalization, or other qualities. Example techniques to deform the input data include adding noise; changing color, shade, or hue; magnification; segmentation; amplification; etc.

In response to receipt of the input data, machine-learned model 322 can provide the output data. The output data can include different types, forms, or variations of output data. As examples, in various implementations, the output data can include content, either stored locally on the user device or in the cloud, that is relevantly shareable along with the initial content selection.

As discussed above, in some implementations, the output data can include various types of classification data (e.g., binary classification, multiclass classification, single label, multi-label, discrete classification, regressive classification, probabilistic classification, etc.) or can include various types of regressive data (e.g., linear regression, polynomial regression, nonlinear regression, simple regression, multiple regression, etc.). In other instances, the output data can include clustering data, anomaly detection data, recommendation data, or any of the other forms of output data discussed above.

In some implementations, the output data can influence downstream processes or decision making. As one example, in some implementations, the output data can be interpreted and/or acted upon by a rules-based regulator.

The present disclosure provides systems and methods that include or otherwise leverage one or more machine-learned models to output a predicted performance score based on the features of a gaming application and of a computing device. Any of the different types or forms of input data described above can be combined with any of the different types or forms of machine-learned models described above to provide any of the different types or forms of output data described above.

The systems and methods of the present disclosure can be implemented by or otherwise executed on one or more computing devices, such as computing system 150 and computing system 250. Example computing devices include user computing devices (e.g., laptops, desktops, and mobile computing devices such as tablets, smartphones, wearable computing devices, etc.); embedded computing devices (e.g., devices embedded within a vehicle, camera, image sensor, industrial machine, satellite, gaming console or controller, or home appliance such as a refrigerator, thermostat, energy meter, home energy manager, smart home assistant, etc.); server computing devices (e.g., database servers, parameter servers, file servers, mail servers, print servers, web servers, game servers, application servers, etc.); dedicated, specialized model processing or training devices; virtual computing devices; other computing devices or computing infrastructure; or combinations thereof.

Figure 3B:
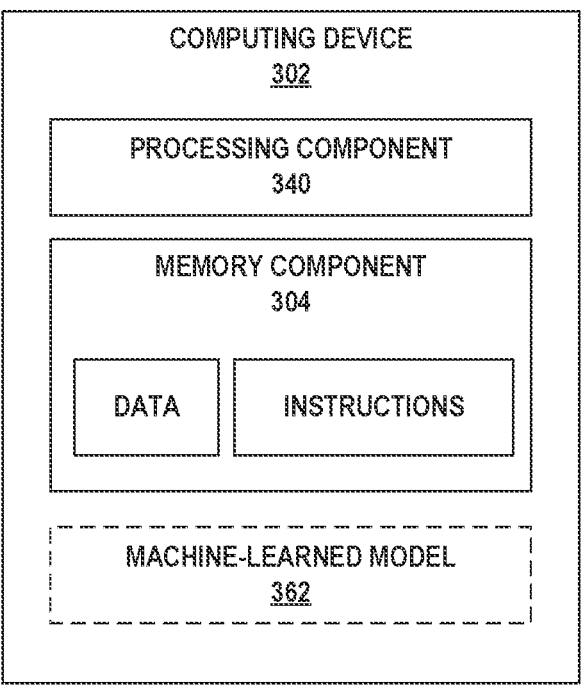

FIG. 3B illustrates a conceptual diagram of computing device 302, which is an example of computing device 102 of FIG. 1. Computing device 302 includes processing component 340, memory component 304 and machine-learned model 322. Computing device 302 may store and implement machine-learned model 322 locally (i.e., on-device). Thus, in some implementations, machine-learned model 322 can be stored at and/or implemented locally by an embedded device or a user computing device such as a mobile device. Output data obtained through local implementation of machine-learned model 322 at the embedded device or the user computing device can be used to improve performance of the embedded device or the user computing device (e.g., an application implemented by the embedded device or the user computing device).

Figure 3C:
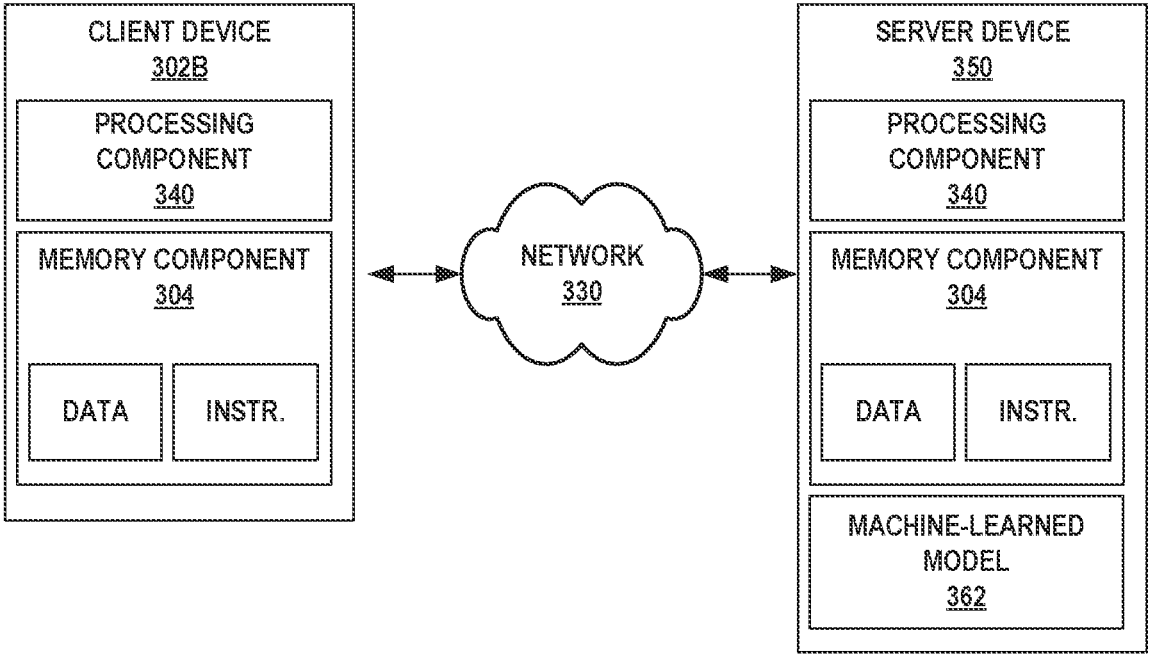

FIG. 3C illustrates a conceptual diagram of an example client computing device that can communicate over a network with an example server computing system that includes a machine-learned model. FIG. 3C includes client device 302A communicating with computing system 350 over network 330. Client device 302A is an example of computing device 102 of FIG. 1, computing system 350 is an example of computing system 150 of FIG. 1 and computing system 250 of FIG. 2, and network 330 is an example of network 130 of FIG. 1. Computing system 350 stores and implements machine-learned model 322. In some instances, output data obtained through machine-learned model 322 at computing system 350 can be used to improve other server tasks or can be used by other non-user devices to improve services performed by or for such other non-user devices. For example, the output data can improve other downstream processes performed by computing system 350 for a computing device of a user or embedded computing device. In other instances, output data obtained through implementation of machine-learned model 322 at computing system 350 can be sent to and used by a user computing device, an embedded computing device, or some other client device, such as client device 302A. For example, computing system 350 can be said to perform machine learning as a service.

In yet other implementations, different respective portions of machine-learned model 322 can be stored at and/or implemented by some combination of a user computing device; an embedded computing device; a server computing device; etc. In other words, portions of machine-learned model 322 may be distributed in whole or in part amongst client device 302A and computing system 350.

Devices 302 and 350 may perform graph processing techniques or other machine learning techniques using one or more machine learning platforms, frameworks, and/or libraries, such as, for example, TensorFlow, Caffe/Caffe2, Theano, Torch/PyTorch, MXnet, CNTK, etc. Devices 302 and 350 may be distributed at different physical locations and connected via one or more networks, including network 330. If configured as distributed computing devices, Devices 302 and 350 may operate according to sequential computing architectures, parallel computing architectures, or combinations thereof. In one example, distributed computing devices can be controlled or guided through use of a parameter server.

In some implementations, multiple instances of machine-learned model 322 can be parallelized to provide increased processing throughput. For example, the multiple instances of machine-learned model 322 can be parallelized on a single processing device or computing device or parallelized across multiple processing devices or computing devices.

Each computing device that implements machine-learned model 322 or other aspects of the present disclosure can include a number of hardware components that enable performance of the techniques described herein. For example, each computing device can include one or more memory devices that store some or all of machine-learned model 322. For example, machine-learned model 322 can be a structured numerical representation that is stored in memory. The one or more memory devices can also include instructions for implementing machine-learned model 322 or performing other operations. Example memory devices include RAM, ROM, EEPROM, EPROM, flash memory devices, magnetic disks, etc., and combinations thereof.

Each computing device can also include one or more processing devices that implement some or all of machine-learned model 322 and/or perform other related operations. Example processing devices include one or more of: a central processing unit (CPU); a visual processing unit (VPU); a graphics processing unit (GPU); a tensor processing unit (TPU); a neural processing unit (NPU); a neural processing engine; a core of a CPU, VPU, GPU, TPU, NPU or other processing device; an application specific integrated circuit (ASIC); a field programmable gate array (FPGA); a co-processor; a controller; or combinations of the processing devices described above. Processing devices can be embedded within other hardware components such as, for example, an image sensor, accelerometer, etc.

Hardware components (e.g., memory devices and/or processing devices) can be spread across multiple physically distributed computing devices and/or virtually distributed computing systems.

Figure 3D:
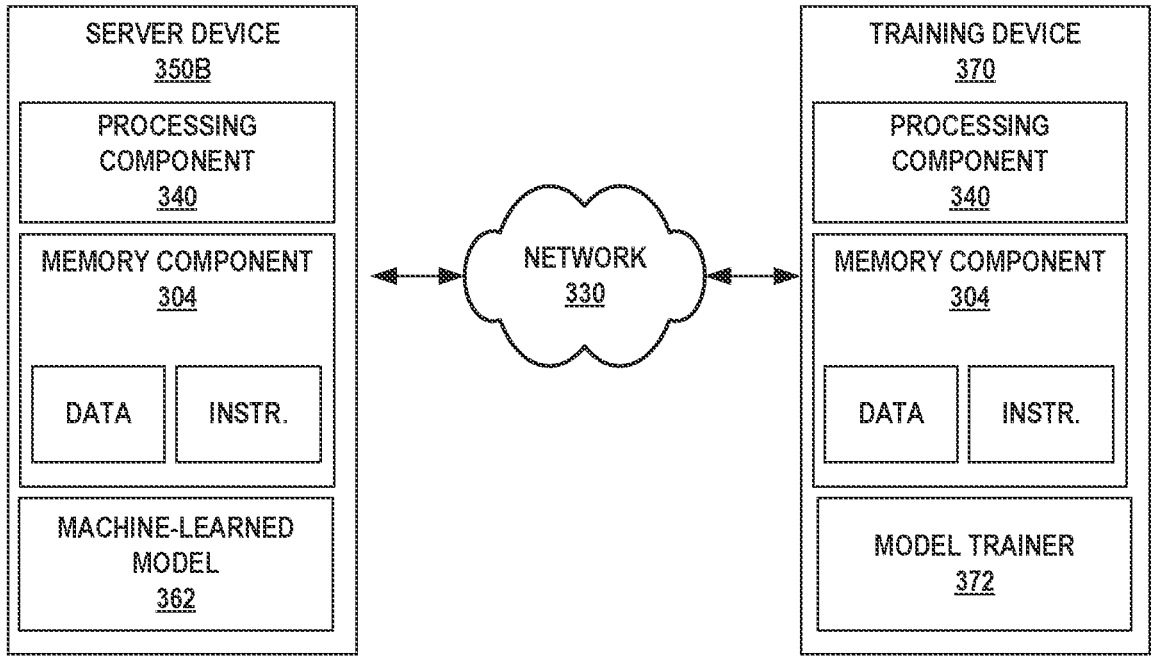

FIG. 3D illustrates a conceptual diagram of an example computing device in communication with an example training computing system that includes a model trainer. FIG. 3D includes computing system 350 communicating with training device 370 over network 330. Computing system 350 is an example of computing system 150 of FIG. 1 and network 330 is an example of network 130 of FIG. 1. Machine-learned model 322 described herein can be trained at a training computing system, such as training device 370, and then provided for storage and/or implementation at one or more computing devices, such as computing system 350. For example, model trainer 372 executes locally at training device 370. However, in some examples, training device 370, including model trainer 372, can be included in or separate from computing system 350 or any other computing device that implements machine-learned model 322.

In some implementations, machine-learned model 322 may be trained in an offline fashion or an online fashion. In offline training (also known as batch learning), machine-learned model 322 is trained on the entirety of a static set of training data. In online learning, machine-learned model 322 is continuously trained (or re-trained) as new training data becomes available (e.g., while the model is used to perform inference).

Model trainer 372, which may be an example of training module 270 of FIG. 2, may perform centralized training of machine-learned model 322 (e.g., based on a centrally stored dataset). In other implementations, decentralized training techniques such as distributed training, federated learning, or the like can be used to train, update, or personalize machine-learned model 322.

Machine-learned model 322 described herein can be trained according to one or more of various different training types or techniques. For example, in some implementations, machine-learned model 322 can be trained by model trainer 372 using supervised learning, in which machine-learned model 322 is trained on a training dataset that includes instances or examples that have labels. The labels can be manually applied by experts, generated through crowdsourcing, or provided by other techniques (e.g., by physics-based or complex mathematical models). In some implementations, if the user has provided consent, the training examples can be provided by the user computing device. In some implementations, this process can be referred to as personalizing the model.

Figure 3E:
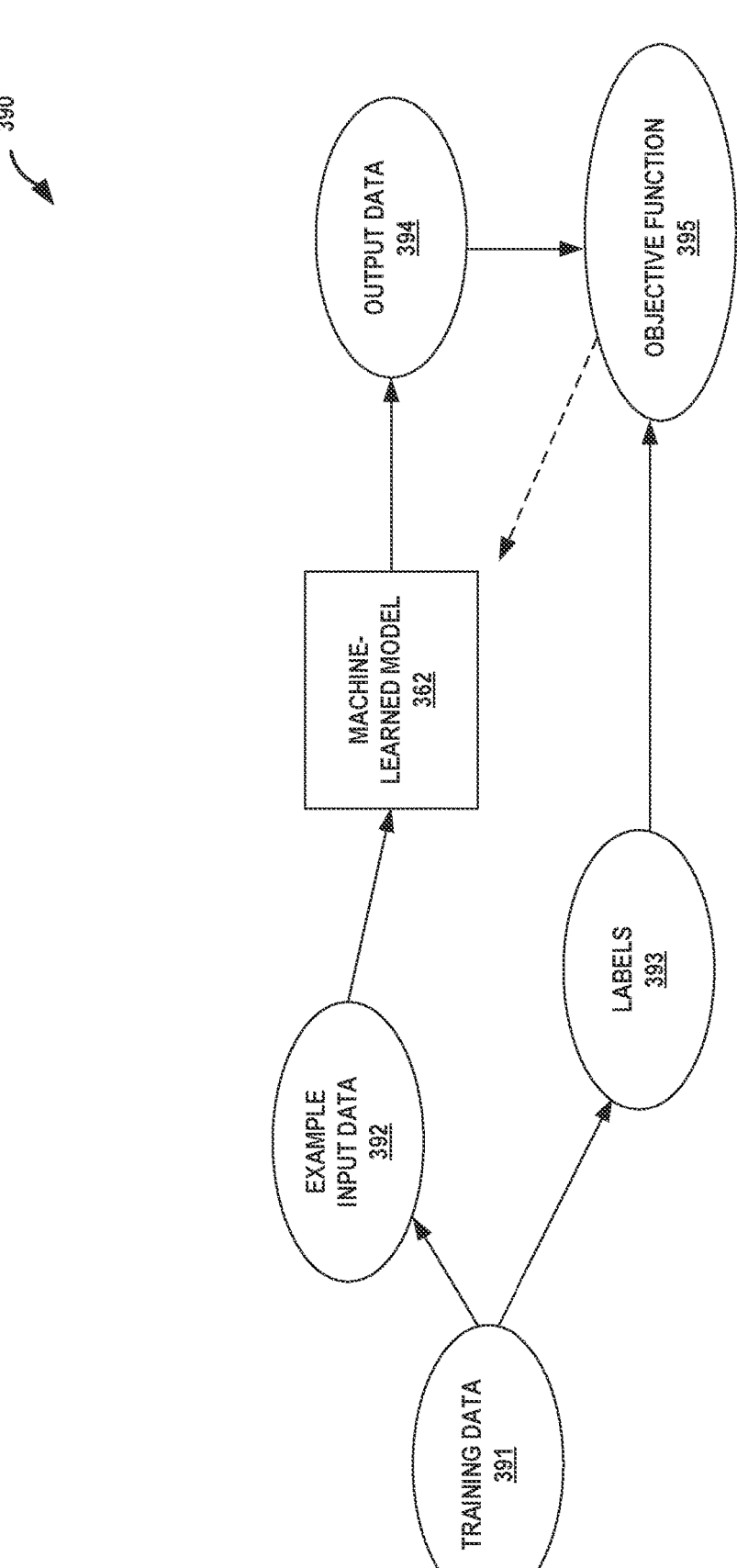

FIG. 3E illustrates a conceptual diagram of training process 390 which is an example training process in which machine-learned model 322 is trained on training data 391 that includes example input data 392 that has labels 393. For example, input data 392 may be device characteristics of computing devices that has labels 393 in the form of smoothness scores associated with gameplay sessions. Training processes 390 is one example training process; other training processes may be used as well.

Training data 391 used by training process 390 can include, upon user permission for use of such data for training, anonymized usage logs of sharing flows, e.g., content items that were shared together, bundled content pieces already identified as belonging together, e.g., from entities in a knowledge graph, etc. In some implementations, training data 391 can include examples of input data 392 that have been assigned labels 393 that correspond to output data 394.

In some implementations, machine-learned model 322 can be trained by optimizing an objective function, such as objective function 395. For example, in some implementations, objective function 395 may be or include a loss function that compares (e.g., determines a difference between) output data generated by the model from the training data and labels (e.g., ground-truth labels) associated with the training data. For example, the loss function can evaluate a sum or mean of squared differences between the output data and the labels. In some examples, objective function 395 may be or include a cost function that describes a cost of a certain outcome or output data. Other examples of objective function 395 can include margin-based techniques such as, for example, triplet loss or maximum-margin training.

One or more of various optimization techniques can be performed to optimize objective function 395. For example, the optimization technique(s) can minimize or maximize objective function 395. Example optimization techniques include Hessian-based techniques and gradient-based techniques, such as, for example, coordinate descent; gradient descent (e.g., stochastic gradient descent); subgradient methods; etc. Other optimization techniques include black box optimization techniques and heuristics.

In some implementations, backward propagation of errors can be used in conjunction with an optimization technique (e.g., gradient based techniques) to train machine-learned model 322 (e.g., when machine-learned model is a multi-layer model such as an artificial neural network). For example, an iterative cycle of propagation and model parameter (e.g., weights) update can be performed to train machine-learned model 322. Example backpropagation techniques include truncated backpropagation through time, Levenberg-Marquardt backpropagation, etc.

In some implementations, machine-learned model 322 described herein can be trained using unsupervised learning techniques. Unsupervised learning can include inferring a function to describe hidden structure from unlabeled data. For example, a classification or categorization may not be included in the data. Unsupervised learning techniques can be used to produce machine-learned models capable of performing clustering, anomaly detection, learning latent variable models, or other tasks.

Machine-learned model 322 can be trained using semi-supervised techniques which combine aspects of supervised learning and unsupervised learning. Machine-learned model 322 can be trained or otherwise generated through evolutionary techniques or genetic algorithms. In some implementations, machine-learned model 322 described herein can be trained using reinforcement learning. In reinforcement learning, an agent (e.g., model) can take actions in an environment and learn to maximize rewards and/or minimize penalties that result from such actions. Reinforcement learning can differ from the supervised learning problem in that correct input/output pairs are not presented, nor suboptimal actions explicitly corrected.

In some implementations, one or more generalization techniques can be performed during training to improve the generalization of machine-learned model 322. Generalization techniques can help reduce overfitting of machine-learned model 322 to the training data. Example generalization techniques include dropout techniques; weight decay techniques; batch normalization; early stopping; subset selection; stepwise selection; etc.

In some implementations, machine-learned model 322 described herein can include or otherwise be impacted by a number of hyperparameters, such as, for example, learning rate, number of layers, number of nodes in each layer, number of leaves in a tree, number of clusters; etc. Hyperparameters can affect model performance. Hyperparameters can be hand selected or can be automatically selected through application of techniques such as, for example, grid search; black box optimization techniques (e.g., Bayesian optimization, random search, etc.); gradient-based optimization; etc. Example techniques and/or tools for performing automatic hyperparameter optimization include Hyperopt; Auto-WEKA; Spearmint; Metric Optimization Engine (MOE); etc.

In some implementations, various techniques can be used to optimize and/or adapt the learning rate when the model is trained. Example techniques and/or tools for performing learning rate optimization or adaptation include Adagrad; Adaptive Moment Estimation (ADAM); Adadelta; RMSprop; etc.

In some implementations, transfer learning techniques can be used to provide an initial model from which to begin training of machine-learned model 322 described herein.

In some implementations, machine-learned model 322 described herein can be included in different portions of computer-readable code on a computing device. In one example, machine-learned model 322 can be included in a particular application or program and used (e.g., exclusively) by such a particular application or program. Thus, in one example, a computing device can include a number of applications and one or more of such applications can contain its own respective machine learning library and machine-learned model(s).

In another example, machine-learned model 322 described herein can be included in an operating system of a computing device (e.g., in a central intelligence layer of an operating system) and can be called or otherwise used by one or more applications that interact with the operating system. In some implementations, each application can communicate with the central intelligence layer (and model(s) stored therein) using an application programming interface (API) (e.g., a common, public API across all applications).

In some implementations, the central intelligence layer can communicate with a central device data layer. The central device data layer can be a centralized repository of data for the computing device. The central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination.

Databases and applications can be implemented on a single system or distributed across multiple systems. Distributed components can operate sequentially or in parallel.

In addition, the machine learning techniques described herein are readily interchangeable and combinable. Although certain example techniques have been described, many others exist and can be used in conjunction with aspects of the present disclosure.

A brief overview of example machine-learned models and associated techniques has been provided by the present disclosure. For additional details, readers should review the following references: Machine Learning A Probabilistic Perspective (Murphy); Rules of Machine Learning: Best Practices for ML Engineering (Zinkevich); Deep Learning (Goodfellow); Reinforcement Learning: An Introduction (Sutton); and Artificial Intelligence: A Modern Approach (Norvig).

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 4 is a flowchart illustrating an example mode of operation for a computing system to determine the predicted performance of a gaming application executing at a computing device, in accordance with one or more techniques of the present disclosure. FIG. 4 is described below in the context of FIGS. 1 and 2.

As shown in FIG. 4, one or more processors 240 of computing system 250 may receive, from a computing device 101, an indication of one or more device characteristics of the computing device 102 (402). In some examples, one or more processors 240 may receive, from computing device 102, a query for a catalog of gaming applications that can be installed at the computing device 102 that includes the indication of the one or more device characteristics of the computing device 102. In some examples, the one or more device characteristics of the computing device 102 include one or more of: central processing unit (CPU) characteristics of the computing device 102, graphics processing unit (GPU) characteristics of the computing device 102, or memory characteristics of the computing device 102.

One or more processors 240 may determine, using a gaming performance model 264 trained using machine learning to determine predicted performance scores of a gaming application 112 and based at least in part on the one or more device characteristics of the computing device 102 and one or more application characteristics of the gaming application 112, a predicted performance of the gaming application 112 when executing in a virtualized environment at the computing device 102 (404). In some examples, the predicted performance of the gaming application 112 when executing in the virtualized environment at the computing device 102 indicates a smoothness score that corresponds to a percentage of frames of image data rendered by the gaming application 112 when executing at the virtualized environment at the computing device 102 that are predicted to meet a frame time of a target frame rate associated with the gaming application 112.

One or more processors 240 may send, to the computing device 102, an indication of the predicted performance of the gaming application 112 when executing in the virtualized environment at the computing device 102 (406). In some examples, one or more processors 240 may send, to the computing device 102, the catalog of gaming applications that can be installed at the computing device 102 that includes the indication of the predicted performance of the gaming application 112 when executing in the virtualized environment at the computing device 102.

In some examples, the gaming performance model 264 is trained using training data derived from data collected from a population of computing devices 120 executing the gaming application 112 to determine the predicted performance scores of the gaming application 112.

In some examples, the training data includes, for a gameplay session of a plurality of gameplay sessions of the gaming application 112 at the population of computing devices 120, one or more device characteristics of a corresponding computing device from the population of computing devices 120 associated with a corresponding smoothness score that corresponds to a percentage of frames of image data rendered by the gaming application 112 during the gameplay session at the corresponding computing device that are predicted to meet a frame time of a target frame rate associated with the gaming application 112.

In some examples, one or more processors 240 may receive the data collected from the population of computing devices 120, wherein the data include frame time metrics associated with frames of image data rendered and outputted by the gaming application 112 executing at the population of computing devices 120, and may determine the corresponding smoothness score of the gameplay session based at least in part on the frame time metrics included in the data collected from the population of computing devices 120.

This disclosure includes the following examples.

Example 1. A method comprising: receiving, by one or more processors of a computing system and from a computing device, an indication of one or more device characteristics of the computing device; determining, by the one or more processors using a gaming performance model trained using machine learning to determine predicted performance scores of a gaming application and based at least in part on the one or more device characteristics of the computing device and one or more application characteristics of the gaming application, a predicted performance of the gaming application when executing in a virtualized environment at the computing device; and sending, by the one or more processors and to the computing device, an indication of the predicted performance of the gaming application when executing in the virtualized environment at the computing device.

Example 2. The method of example 1, wherein the predicted performance of the gaming application when executing in the virtualized environment at the computing device indicates a smoothness score that corresponds to a percentage of frames of image data rendered by the gaming application when executing at the virtualized environment at the computing device that are predicted to meet a frame time of a target frame rate associated with the gaming application.

Example 3. The method of any of examples 1 and 2, wherein the one or more device characteristics of the computing device include one or more of: central processing unit (CPU) characteristics of the computing device, graphics processing unit (GPU) characteristics of the computing device, or memory characteristics of the computing device.

Example 4. The method of any of examples 1-3, wherein the gaming performance model is trained using training data derived from performance metrics collected from a population of computing devices executing the gaming application to determine the predicted performance scores of the gaming application.

Example 5. The method of example 4, wherein the training data includes, for a gameplay session of a plurality of gameplay sessions of the gaming application at the population of computing devices, one or more device characteristics of a corresponding computing device from the population of computing devices associated with a corresponding smoothness score that corresponds to a percentage of frames of image data rendered by the gaming application during the gameplay session at the corresponding computing device that are predicted to meet a frame time of a target frame rate associated with the gaming application.

Example 6. The method of example 5, further comprising: receiving, by the one or more processors, the performance metrics collected from the population of computing devices, wherein the performance metrics include frame time metrics associated with frames of image data rendered and outputted by the gaming application executing at the population of computing devices; and determining, by the one or more processors, the corresponding smoothness score of the gameplay session based at least in part on the frame time metrics included in the performance metrics collected from the population of computing devices.

Example 7. The method of any of examples 1-6, wherein receiving, from the computing device, the indication of the one or more device characteristics of the computing device comprises receiving, by the one or more processors and from the computing device, a query for a catalog of gaming applications that can be installed at the computing device that includes the indication of the one or more device characteristics of the computing device; and wherein sending, to the computing device, the indication of the predicted performance of the gaming application when executing in the virtualized environment at the computing device further comprises sending, by the one or more processors and to the computing device, the catalog of gaming applications that can be installed at the computing device that includes the indication of the predicted performance of the gaming application when executing in the virtualized environment at the computing device.

Example 8. A computing system comprising: memory; a network interface; and one or more processors operably coupled to the memory and the network interface and configured to: receive, from a computing device and via the network interface, an indication of one or more device characteristics of the computing device; determine, using a gaming performance model trained using machine learning to determine predicted performance scores of a gaming application and based at least in part on the one or more device characteristics of the computing device and one or more application characteristics of the gaming application, a predicted performance of the gaming application when executing in a virtualized environment at the computing device; and send, via the network interface and to the computing device, an indication of the predicted performance of the gaming application when executing in the virtualized environment at the computing device.

Example 9. The computing system of example 8, wherein the predicted performance of the gaming application when executing in the virtualized environment at the computing device indicates a smoothness score that corresponds to a percentage of frames of image data rendered by the gaming application when executing at the virtualized environment at the computing device that are predicted to meet a frame time of a target frame rate associated with the gaming application.

Example 10. The computing system of any of examples 8 and 9, wherein the one or more device characteristics of the computing device include one or more of: central processing unit (CPU) characteristics of the computing device, graphics processing unit (GPU) characteristics of the computing device, or memory characteristics of the computing device.

Example 11. The computing system of any of examples 8-10, wherein the gaming performance model is trained using training data derived from performance metrics collected from a population of computing devices executing the gaming application to determine the predicted performance scores of the gaming application.

Example 12. The computing system of example 11, wherein the training data includes, for a gameplay session of a plurality of gameplay sessions of the gaming application at the population of computing devices, one or more device characteristics of a corresponding computing device from the population of computing devices associated with a corresponding smoothness score that corresponds to a percentage of frames of image data rendered by the gaming application during the gameplay session at the corresponding computing device that are predicted to meet a frame time of a target frame rate associated with the gaming application.

Example 13. The computing system of example 12, wherein the one or more processors are further configured to: receive the performance metrics collected from the population of computing devices, wherein the data include frame time metrics associated with frames of image data rendered and outputted by the gaming application executing at the population of computing devices; and determine the corresponding smoothness score of the gameplay session based at least in part on the frame time metrics included in the performance metrics collected from the population of computing devices.

Example 14. The computing system of any of examples 8-13, wherein to receive, from the computing device, the indication of the one or more device characteristics of the computing device, the one or more processors are further configured to receive, from the computing device, a query for a catalog of gaming applications that can be installed at the computing device that includes the indication of the one or more device characteristics of the computing device; and wherein to send, to the computing device, the indication of the predicted performance of the gaming application when executing in the virtualized environment at the computing device, the one or more processors are further configured to send, to the computing device, the catalog of gaming applications that can be installed at the computing device that includes the indication of the predicted performance of the gaming application when executing in the virtualized environment at the computing device.

Example 15. A computer-readable storage medium storing instructions that, when executed, cause one or more processors of a computing system to: receive, from a computing device, an indication of one or more device characteristics of the computing device; determine, using a gaming performance model trained using machine learning to determine predicted performance scores of a gaming application and based at least in part on the one or more device characteristics of the computing device and one or more application characteristics of the gaming application, a predicted performance of the gaming application when executing in a virtualized environment at the computing device; and send, to the computing device, an indication of the predicted performance of the gaming application when executing in the virtualized environment at the computing device.

Example 16. The computer-readable storage medium of example 15, wherein the predicted performance of the gaming application when executing in the virtualized environment at the computing device indicates a smoothness score that corresponds to a percentage of frames of image data rendered by the gaming application when executing at the virtualized environment at the computing device that are predicted to meet a frame time of a target frame rate associated with the gaming application.

Example 17. The computer-readable storage medium of any of examples 15 and 16, wherein the one or more device characteristics of the computing device include one or more of: central processing unit (CPU) characteristics of the computing device, graphics processing unit (GPU) characteristics of the computing device, or memory characteristics of the computing device.

Example 18. The computer-readable storage medium of any of examples 15-17, wherein the gaming performance model is trained using training data derived from performance metrics collected from a population of computing devices executing the gaming application to determine the predicted performance scores of the gaming application.

Example 19. The computer-readable storage medium of example 18, wherein the training data includes, for a gameplay session of a plurality of gameplay sessions of the gaming application at the population of computing devices, one or more device characteristics of a corresponding computing device from the population of computing devices associated with a corresponding smoothness score that corresponds to a percentage of frames of image data rendered by the gaming application during the gameplay session at the corresponding computing device that are predicted to meet a frame time of a target frame rate associated with the gaming application.

Example 20. The computer-readable storage medium of example 19, wherein the instructions further cause the one or more processors to: receive the performance metrics collected from the population of computing devices, wherein the performance metrics include frame time metrics associated with frames of image data rendered and outputted by the gaming application executing at the population of computing devices; and determine the corresponding smoothness score of the gameplay session based at least in part on the frame time metrics included in the performance metrics collected from the population of computing devices.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:

receiving, by one or more processors of a computing system and from a computing device, an indication of one or more device characteristics of the computing device;

determining, by the one or more processors using a gaming performance model trained using machine learning to determine predicted performance scores of a gaming application and based at least in part on the one or more device characteristics of the computing device and one or more application characteristics of the gaming application, a predicted performance of the gaming application when executing in a virtualized environment at the computing device, wherein the virtualized environment is hosted by a first operating system executing at the computing device, wherein a second operating system is executing within the virtualized environment, and wherein the first operating system is different from the second operating system; and sending, by the one or more processors and to the computing device, an indication of the predicted performance of the gaming application when executing in the virtualized environment at the computing device.

2. The method of claim 1, wherein the predicted performance of the gaming application when executing in the virtualized environment at the computing device indicates a smoothness score that corresponds to a percentage of frames of image data rendered by the gaming application when executing at the virtualized environment at the computing device that are predicted to meet a frame time of a target frame rate associated with the gaming application.

3. The method of claim 1, wherein the one or more device characteristics of the computing device include one or more of: central processing unit (CPU) characteristics of the computing device, graphics processing unit (GPU) characteristics of the computing device, or memory characteristics of the computing device.

4. The method of claim 1, wherein the gaming performance model is trained using training data derived from performance metrics collected from a population of computing devices executing the gaming application to determine the predicted performance scores of the gaming application.

5. The method of claim 4, wherein the training data includes, for a gameplay session of a plurality of gameplay sessions of the gaming application at the population of computing devices, one or more device characteristics of a corresponding computing device from the population of computing devices associated with a corresponding smoothness score that corresponds to a percentage of frames of image data rendered by the gaming application during the gameplay session at the corresponding computing device that are predicted to meet a frame time of a target frame rate associated with the gaming application.

6. The method of claim 5, further comprising:
receiving, by the one or more processors, the performance metrics collected from the population of computing devices, wherein the performance metrics include frame time metrics associated with frames of image data rendered and outputted by the gaming application executing at the population of computing devices; and
determining, by the one or more processors, the corresponding smoothness score of the gameplay session based at least in part on the frame time metrics included in the performance metrics collected from the population of computing devices.

7. The method of claim 1,
wherein receiving, from the computing device, the indication of the one or more device characteristics of the computing device comprises receiving, by the one or more processors and from the computing device, a query for a catalog of gaming applications that includes the indication of the one or more device characteristics of the computing device; and
wherein sending, to the computing device, the indication of the predicted performance of the gaming application when executing in the virtualized environment at the computing device further comprises sending, by the one or more processors and to the computing device, the catalog of gaming applications that includes the indication of the predicted performance of the gaming application when executing in the virtualized environment at the computing device.

8. A computing system comprising:
memory;
a network interface; and
one or more processors operably coupled to the memory and the network interface and configured to:
receive, from a computing device and via the network interface, an indication of one or more device characteristics of the computing device;
determine, using a gaming performance model trained using machine learning to determine predicted performance scores of a gaming application and based at least in part on the one or more device characteristics of the computing device and one or more application characteristics of the gaming application, a predicted performance of the gaming application when executing in a virtualized environment at the computing device, wherein the virtualized environment is hosted by a first operating system executing at the computing device, wherein a second operating system is executing within the virtualized environment, and wherein the first operating system is different from the second operating system; and
send, via the network interface and to the computing device, an indication of the predicted performance of the gaming application when executing in the virtualized environment at the computing device.

9. The computing system of claim 8, wherein the predicted performance of the gaming application when executing in the virtualized environment at the computing device indicates a smoothness score that corresponds to a percentage of frames of image data rendered by the gaming application when executing at the virtualized environment at the computing device that are predicted to meet a frame time of a target frame rate associated with the gaming application.

10. The computing system of claim 8, wherein the one or more device characteristics of the computing device include one or more of: central processing unit (CPU) characteristics of the computing device, graphics processing unit (GPU) characteristics of the computing device, or memory characteristics of the computing device.

11. The computing system of claim 8, wherein the gaming performance model is trained using training data derived from performance metrics collected from a population of computing devices executing the gaming application to determine the predicted performance scores of the gaming application.

12. The computing system of claim 11, wherein the training data includes, for a gameplay session of a plurality of gameplay sessions of the gaming application at the population of computing devices, one or more device characteristics of a corresponding computing device from the population of computing devices associated with a corresponding smoothness score that corresponds to a percentage of frames of image data rendered by the gaming application during the gameplay session at the corresponding computing device that are predicted to meet a frame time of a target frame rate associated with the gaming application.

13. The computing system of claim 12, wherein the one or more processors are further configured to:
receive the performance metrics collected from the population of computing devices, wherein the data include frame time metrics associated with frames of image data rendered and outputted by the gaming application executing at the population of computing devices; and
determine the corresponding smoothness score of the gameplay session based at least in part on the frame time metrics included in the performance metrics collected from the population of computing devices.

14. The computing system of claim 8,
wherein to receive, from the computing device, the indication of the one or more device characteristics of the computing device, the one or more processors are further configured to receive, from the computing device, a query for a catalog of gaming applications that includes the indication of the one or more device characteristics of the computing device; and
wherein to send, to the computing device, the indication of the predicted performance of the gaming application when executing in the virtualized environment at the computing device, the one or more processors are further configured to send, to the computing device, the catalog of gaming applications that includes the indication of the predicted performance of the gaming application when executing in the virtualized environment at the computing device.

15. A computer-readable storage medium storing instructions that, when executed, cause one or more processors of a computing system to:
receive, from a computing device, an indication of one or more device characteristics of the computing device;
determine, using a gaming performance model trained using machine learning to determine predicted performance scores of a gaming application and based at least in part on the one or more device characteristics of the computing device and one or more application characteristics of the gaming application, a predicted performance of the gaming application when executing in a virtualized environment at the computing device, wherein the virtualized environment is hosted by a first operating system executing at the computing device, wherein a second operating system is executing within the virtualized environment, and wherein the first operating system is different from the second operating system; and
send, to the computing device, an indication of the predicted performance of the gaming application when executing in the virtualized environment at the computing device.

16. The computer-readable storage medium of claim 15, wherein the predicted performance of the gaming application when executing in the virtualized environment at the computing device indicates a smoothness score that corresponds to a percentage of frames of image data rendered by the gaming application when executing at the virtualized environment at the computing device that are predicted to meet a frame time of a target frame rate associated with the gaming application.

17. The computer-readable storage medium of claim 15, wherein the one or more device characteristics of the computing device include one or more of: central processing unit (CPU) characteristics of the computing device, graphics processing unit (GPU) characteristics of the computing device, or memory characteristics of the computing device.

18. The computer-readable storage medium of claim 15, wherein the gaming performance model is trained using training data derived from performance metrics collected from a population of computing devices executing the gaming application to determine the predicted performance scores of the gaming application.

19. The computer-readable storage medium of claim 18, wherein the training data includes, for a gameplay session of a plurality of gameplay sessions of the gaming application at the population of computing devices, one or more device characteristics of a corresponding computing device from the population of computing devices associated with a corresponding smoothness score that corresponds to a percentage of frames of image data rendered by the gaming application during the gameplay session at the corresponding computing device that are predicted to meet a frame time of a target frame rate associated with the gaming application.

20. The computer-readable storage medium of claim 19, wherein the instructions further cause the one or more processors to:
receive the performance metrics collected from the population of computing devices, wherein the performance metrics include frame time metrics associated with frames of image data rendered and outputted by the gaming application executing at the population of computing devices; and
determine the corresponding smoothness score of the gameplay session based at least in part on the frame time metrics included in the performance metrics collected from the population of computing devices.

* * * * *